US012700620B2

(12) United States Patent
Yang et al.

(10) Patent No.: US 12,700,620 B2
(45) Date of Patent: Aug. 4, 2026

(54) BATTERY PACK, POWER TOOL SYSTEM, AND CHARGING SYSTEM

(71) Applicant: Nanjing Chervon Industry Co., Ltd., Nanjing (CN)

(72) Inventors: Dong Yang, Nanjing (CN); Zhijun Dong, Nanjing (CN); Guiwu Hu, Nanjing (CN); Dezhong Yang, Nanjing (CN); Tianxiao Xu, Nanjing (CN); Huaishu Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 116 days.

(21) Appl. No.: 18/643,052

(22) Filed: Apr. 23, 2024

(65) Prior Publication Data

US 2024/0274896 A1     Aug. 15, 2024

Related U.S. Application Data

(63) Continuation of application No. 17/886,056, filed on Aug. 11, 2022, now Pat. No. 12,002,931, which is a (Continued)

(30) Foreign Application Priority Data

| Sep. 30, 2020 | (CN) | .......................... | 202011057089.7 |
| Sep. 30, 2020 | (CN) | .......................... | 202011057097.1 |

(Continued)

(51) Int. Cl.
  *H01M 10/42* (2006.01)
  *B25F 5/02* (2006.01)
  (Continued)

(52) U.S. Cl.
  CPC ............. *H01M 10/425* (2013.01); *B25F 5/02* (2013.01); *H01M 50/209* (2021.01);
  (Continued)

(58) Field of Classification Search
  CPC ............. H01M 10/425; H01M 50/209; H01M 50/543; H01M 2220/30; H01M 10/44;
  (Continued)

(56) References Cited

U.S. PATENT DOCUMENTS

| 5,391,972 A | * | 2/1995 | Gardner | .............. | H01M 10/488 |
| | | | | | 439/259 |
| 7,433,655 B2 | * | 10/2008 | Jacobs | .............. | H01M 10/4264 |
| | | | | | 429/185 |

(Continued)

FOREIGN PATENT DOCUMENTS

| CN | 86201602 U | * | 3/1987 | ............. Y02E 60/12 |
| CN | 201450354 U | | 5/2010 | |

(Continued)

OTHER PUBLICATIONS

"Battery Pack", Jung to et al., (Jung), Machine Translation of KR 20170012669 A(Year: 2017).*

(Continued)

*Primary Examiner* — M Baye Diao
(74) *Attorney, Agent, or Firm* — Greenberg Traurig, LLP

(57)     ABSTRACT

A battery pack includes a housing of a first material, a cell assembly, and a cell support of a second material. The cell assembly is disposed in the housing and includes a plurality of cell units. The cell unit includes a positive electrode of the cell unit and a negative electrode of the cell unit. The cell support is configured to support at least the cell assembly. The cell support is at least disposed at two ends of the cell assembly and at least part of the cell support encapsulates the positive electrode of the cell unit and the negative (Continued)

electrode of the cell unit. The first material is different from the second material.

18 Claims, 19 Drawing Sheets

Related U.S. Application Data continuation of application No. 17/689,695, filed on Mar. 8, 2022, now Pat. No. 11,450,896, which is a continuation of application No. PCT/CN2021/120244, filed on Sep. 24, 2021.

(30) Foreign Application Priority Data

| Sep. 30, 2020 | (CN) | 202011057113.7 |
| Sep. 30, 2020 | (CN) | 202011061729.1 |
| Sep. 30, 2020 | (CN) | 202011061730.4 |
| Sep. 30, 2020 | (CN) | 202011061751.6 |

(51) Int. Cl.
*H01M 50/209* (2021.01)
*H01M 50/543* (2021.01)
*H02J 7/70* (2026.01)

(52) U.S. Cl.
CPC ........... *H01M 50/543* (2021.01); *H02J 7/731* (2026.01); *H02J 7/751* (2026.01); *H01M 2220/30* (2013.01)

(58) Field of Classification Search
CPC .. H01M 10/441; H01M 10/48; H01M 50/211; H01M 50/213; H01M 50/267; H01M 50/284; H01M 50/293; H01M 50/298; H01M 50/503; H01M 50/51; H01M 50/522; H01M 50/534; H01M 50/55; H01M 10/0525; B25F 5/02; H02J 7/0044; H02J 7/0045; H02J 7/00036; H02J 7/00038; H02J 7/0013; H02J 7/007; Y02E 60/10
USPC ........................................................ 320/107
See application file for complete search history.

(56) References Cited

U.S. PATENT DOCUMENTS

| 7,492,124 | B2 * | 2/2009 | Johnson | B25F 5/02 |
| | | | | 320/107 |
| 7,589,500 | B2 * | 9/2009 | Johnson | H01M 10/0525 |
| | | | | 320/132 |
| 7,656,131 | B2 * | 2/2010 | Embrey | H02J 7/685 |
| | | | | 320/152 |
| 7,719,234 | B2 | 5/2010 | Carrier | |
| 8,330,426 | B2 * | 12/2012 | Suzuki | B25F 5/00 |
| | | | | 362/183 |
| 8,551,631 | B2 * | 10/2013 | Tanahashi | H01M 50/291 |
| | | | | 429/71 |
| 8,984,711 | B2 | 3/2015 | Ota | |
| 9,318,729 | B2 * | 4/2016 | Ogura | H01M 50/50 |
| 9,537,336 | B2 * | 1/2017 | Suzuki | B25H 3/022 |
| 9,748,780 | B2 | 8/2017 | Suzuki | |
| 9,819,051 | B2 | 11/2017 | Johnson | |
| 10,348,110 | B2 * | 7/2019 | Kondo | H01M 50/213 |
| 10,587,134 | B2 | 3/2020 | Kondo | |
| 10,797,281 | B2 * | 10/2020 | Dietel | H01M 10/46 |
| 10,821,591 | B2 * | 11/2020 | Verbrugge | H02K 7/145 |
| 10,862,176 | B2 | 12/2020 | Degelau | |
| 11,264,818 | B2 | 3/2022 | Lee | |

| 11,394,216 | B2 | 7/2022 | Jiao | |
| 11,824,169 | B2 * | 11/2023 | Nishikawa | H01M 50/269 |
| 2008/0203995 | A1 | 8/2008 | Carrier | |
| 2010/0084150 | A1 * | 4/2010 | Suzuki | B25F 5/00 |
| | | | | 173/217 |
| 2011/0197389 | A1 * | 8/2011 | Ota | H02J 7/65 |
| | | | | 429/121 |
| 2012/0037385 | A1 | 2/2012 | Suzuki | |
| 2013/0224528 | A1 * | 8/2013 | Johnson | H01M 10/0525 |
| | | | | 429/7 |
| 2013/0293197 | A1 | 11/2013 | Sakakibara | |
| 2013/0328524 | A1 * | 12/2013 | Bartulec | H02J 50/10 |
| | | | | 320/108 |
| 2013/0335013 | A1 | 12/2013 | Suzuki | |
| 2014/0087227 | A1 | 3/2014 | Shih | |
| 2014/0131059 | A1 * | 5/2014 | Verbrugge | B25B 21/02 |
| | | | | 173/217 |
| 2014/0255745 | A1 * | 9/2014 | Choi | H04B 1/3888 |
| | | | | 429/96 |
| 2014/0302353 | A1 * | 10/2014 | Ogura | H01M 50/572 |
| | | | | 429/7 |
| 2015/0037649 | A1 * | 2/2015 | Wyatt | H01M 50/224 |
| | | | | 429/152 |
| 2015/0188332 | A1 * | 7/2015 | Nakano | H02J 7/44 |
| | | | | 320/112 |
| 2016/0241065 | A1 * | 8/2016 | Kondo | H01M 50/213 |
| 2017/0353041 | A1 | 12/2017 | Klee | |
| 2018/0114960 | A1 * | 4/2018 | Sato | H01M 50/209 |
| 2018/0331402 | A1 | 11/2018 | Inoue | |
| 2019/0260209 | A1 | 8/2019 | Tomomasa | |
| 2020/0194843 | A1 | 6/2020 | Kwon | |
| 2020/0235537 | A1 | 7/2020 | Lin | |
| 2022/0102995 | A1 | 3/2022 | Fieldbinder | |

FOREIGN PATENT DOCUMENTS

| CN | 101758488 | B | | 7/2012 | |
| CN | 103081167 | A | | 5/2013 | |
| CN | 102162820 | B | | 2/2014 | |
| CN | 105431962 | A | * | 3/2016 | ........ H01M 10/0525 |
| CN | 105431973 | A | * | 3/2016 | ............. B60L 50/64 |
| CN | 104103799 | B | | 8/2016 | |
| CN | 109713764 | A | | 5/2019 | |
| CN | 110265616 | A | | 6/2020 | |
| CN | 111416077 | A | | 7/2020 | |
| CN | 110364675 | A | | 10/2020 | |
| CN | 106233571 | B | | 7/2021 | |
| CN | 109950944 | A | | 11/2021 | |
| DE | 102017109919 | A1 | | 11/2018 | |
| EP | 2787560 | B1 | | 3/2016 | |
| EP | 3059781 | B1 | | 4/2018 | |
| EP | 4012828 | A1 | | 6/2022 | |
| JP | 2012221584 | A | | 11/2012 | |
| JP | 2019021594 | A | | 2/2019 | |
| KR | 20160067002 | A | | 6/2016 | |
| KR | 20170012669 | A | * | 2/2017 | ......... H01M 2/0217 |
| KR | 20190074338 | A | | 6/2019 | |
| WO | 2013011626 | A1 | | 1/2013 | |
| WO | 2013127313 | A1 | | 9/2013 | |
| WO | 2018098628 | A1 | | 6/2018 | |

OTHER PUBLICATIONS

Examination report issued on Australian patent application No. 2021338586, dated Jan. 16, 2023, 5 pages.

Extended European Search Report from application No. 21863088.7, dated May 31, 2023, 5 pp.

International Search Report and Written Opinion of application No. PCT/CN2021/120244, dated Nov. 25, 2021, 16 pages.

Office Action from Canadian application No. 3,156,090, dated Jun. 27, 2023, 4 pp.

* cited by examiner

First
direction

BATTERY PACK, POWER TOOL SYSTEM, AND CHARGING SYSTEM

RELATED APPLICATION INFORMATION

This application is a continuation of U.S. application Ser. No. 17/886,056, filed on Aug. 11, 2022, which application is a continuation of U.S. application Ser. No. 17/689,695, filed on Mar. 8, 2022, which application is a continuation of International Application Number PCT/CN2021/120244, filed on Sep. 24, 2021, through which this application also claims the benefit under 35 U.S.C. § 119(a) of Chinese Patent Application No. CN 202011061730.4, filed on Sep. 30, 2020, Chinese Patent Application No. CN 202011061751.6, filed on Sep. 30, 2020, Chinese Patent Application No. 202011057097.1, filed on Sep. 30, 2020, Chinese Patent Application No. CN 202011057089.7, filed on Sep. 30, 2020, Chinese Patent Application No. CN 202011057113.7, filed on Sep. 30, 2020, and Chinese Patent Application No. CN 202011061729.1, filed on Sep. 30, 2020, all of which are incorporated herein by reference in their entirety.

BACKGROUND

Based on the use requirement for portability, more and more power tools currently use battery packs as power sources.

The battery packs for supplying power to the power tools mostly use cylindrical lithium cells. Multiple cylindrical lithium cells connected in series and in parallel ensure sufficient electric power output so that the endurance of the power tools is improved.

At present, a cylindrical lithium-ion battery generally includes a cell, that is, a positive electrode sheet, a negative electrode sheet, and a separator are wound so as to form the cell, and an electrolyte, a battery housing, upper and lower insulating gaskets, and a cap are sealed so as to complete the preparation. The power tool is operating while this type of battery is being charged or discharged, resulting in a series of unfavorable factors that affect the service life of the battery. For example, due to inevitable vibration and jitter of the power tool, the internal lithium-ion battery is subjected to constant impacts from external forces such as vibration and jitter at the same time. Solder joints of exposed tabs of a negative electrode and at the bottom of a steel shell are more likely to break due to continuous external impacts, thereby affecting the service life of the cylindrical lithium-ion battery.

SUMMARY

The present application provides a battery pack, which has better anti-fall and shock-absorbing A battery pack includes a housing of a first material, a cell assembly, and a cell support of a second material. The cell assembly is disposed in the housing and includes a plurality of non-cylindrical cell units. Each of the plurality of cell units includes a positive electrode of the each of the plurality of cell units and a negative electrode of the each of the plurality of the cell units. The cell support is configured to support at least the cell assembly. The cell support is at least disposed at two ends of the cell assembly, and at least part of the cell support encapsulates the positive electrode of the each of the plurality of cell units and the negative electrode of the each of the plurality of cell units. The first material is different from the second material.

In one example, the cell support includes a first support and a second support, where the first support is disposed on a front end surface of the cell assembly, and the second support is disposed on a rear end surface opposite to the front end surface.

In one example, the cell support is disposed around a front end surface, a rear end surface, a left side surface, a right side surface, and a lower bottom surface of the cell assembly; and the cell support forms an accommodation space with an upper opening and for accommodating the cell assembly.

In one example, the cell assembly includes a positive terminal of the cell assembly, a negative terminal of the cell assembly, a positive lead-out piece, and a negative lead-out piece. The positive terminal of the cell assembly is connected to a positive electrode of at least one of the plurality of cell units. The negative terminal of the cell assembly is connected to a negative electrode of at least one of the plurality of cell units. The positive lead-out piece connects the positive terminal of the cell assembly to the positive electrode of the each of the plurality of cell units. The negative lead-out piece connects the negative terminal of the cell assembly to the negative electrode of the each of the plurality of cell units. The cell support encapsulates the positive electrode of the each of the plurality of cell units, the negative electrode of the each of the plurality of cell units, the positive lead-out piece, and the negative lead-out piece.

In one example, the battery pack further includes a buffer layer disposed between adjacent cells and made of the second material.

In one example, the first material is a thermoplastic material; and the second material is a thermosetting material.

In one example, the cell support is formed at the two ends of the cell assembly in a glue injection manner.

In one example, the positive electrode of the each of the plurality of cell units and the negative electrode of the each of the plurality of cell units are disposed on a same side.

In one example, the battery pack has a discharge current of greater than or equal to 80 A.

In one example, an energy density (energy/mass of the battery pack) of the cell assembly is in a value range of greater than 200 Wh/kg.

A battery pack includes a housing of a first material, a cell assembly, and a cell support of a second material. The cell assembly is disposed in the housing and includes a plurality of non-cylindrical cell units. Each of the plurality of cell units includes a positive electrode of the each of the plurality of cell units and a negative electrode of the each of the plurality of the cell units. The cell support is configured to support at least the cell assembly. The cell support is at least disposed at two ends of the cell assembly, and at least part of the cell support encapsulates the positive electrode of the each of the plurality of cell units and the negative electrode of the each of the plurality of cell units. A hardness of the first material is different from a hardness of the second material.

In one example, the cell support includes a first support and a second support.

The first support is disposed on a front end surface of the cell assembly, and the second support is disposed on a rear end surface of the cell assembly. The front end surface and the rear end surface are opposite to each other.

In one example, the cell support is disposed around a front end surface, a rear end surface, a left side surface, a right side surface, and a lower bottom surface of the cell assembly; and the cell support forms an accommodation space with an upper opening and for accommodating the cell assembly.

In one example, the cell assembly includes a positive terminal of the cell assembly, a negative terminal of the cell assembly, a positive lead-out piece, and a negative lead-out piece. The positive terminal of the cell assembly is connected to a positive electrode of at least one of the plurality of cell units. The negative terminal of the cell assembly is connected to a negative electrode of at least one of the plurality of cell units. The positive lead-out piece connects the positive terminal of the cell assembly to the positive electrode of the each of the plurality of cell units. The negative lead-out piece connects the negative terminal of the cell assembly to the negative electrode of the each of the plurality of cell units. The cell support encapsulates the positive electrode of the each of the plurality of cell units, the negative electrode of the each of the plurality of cell units, the positive lead-out piece, and the negative lead-out piece.

In one example, the battery pack further includes a buffer layer disposed between adjacent cells and made of the second material.

In one example, the second material is an insulating material.

In one example, the cell support is formed at the two ends of the cell assembly in a glue injection manner.

In one example, the positive electrode of the each of the plurality of cell units and the negative electrode of the each of the plurality of cell units are disposed on a same side.

In one example, the battery pack has a discharge current of greater than or equal to 80 A.

In one example, an energy density (energy/mass of the battery pack) of the cell assembly is in a value range of greater than 200 Wh/kg.

The present application adopts the preceding technical solutions so that the anti-vibration and impact resistance of the battery pack can be improved, and the reliability and service life of the battery can be significantly improved.

A power tool system includes a power tool, a rechargeable battery pack, a first rechargeable battery pack, and a second rechargeable battery pack. The power tool is provided with a tool interface and a motor. The rechargeable battery pack is provided with a battery pack interface and a cell assembly. The first rechargeable battery pack includes a plurality of first rechargeable cells, where the plurality of first rechargeable cells are cylindrical. The second rechargeable battery pack includes a plurality of second rechargeable cells each with a different shape from each of the plurality of first rechargeable cells. The first rechargeable battery pack or the second rechargeable battery pack is capable of supplying power to the power tool. The first rechargeable battery pack has a first interface adaptable to the tool interface and a first electrical characteristic, the second rechargeable battery pack has a second interface adaptable to the tool interface, a shape of the first interface is basically the same as a shape of the second interface, and an internal resistance of each of the plurality of second rechargeable cells is less than an internal resistance of each of the plurality of first rechargeable cells.

In one example, the second rechargeable battery pack has a second electrical characteristic different from the first electrical characteristic of the first rechargeable battery pack.

In one example, the second electrical characteristic includes at least one of the following electrical parameters: a discharge current or full battery endurance of the second rechargeable battery pack.

In one example, the power tool includes a tool identification module and a tool control module. The tool identification module is configured to identify one of the first rechargeable battery pack or the second rechargeable battery pack connected through the tool interface. The tool control module is further configured to receive an identification signal from the tool identification module; in the case where the first rechargeable battery pack is connected through the tool interface, control the first rechargeable battery pack to discharge at a first discharge current; and in the case where the second rechargeable battery pack is connected through the tool interface, control the second rechargeable battery pack to discharge at a second discharge current which is not greater than the first discharge current.

In one example, the power tool includes a tool identification module and a tool control module. The tool identification module is configured to identify one of the first rechargeable battery pack or the second rechargeable battery pack connected through the tool interface. The tool control module is further configured to receive an identification signal from the tool identification module; in the case where the first rechargeable battery pack is connected through the tool interface, control the first rechargeable battery pack to output electric power at a first voltage; and in the case where the second rechargeable battery pack is connected through the tool interface, control the second rechargeable battery pack to output electric power at a second voltage, where the second voltage is greater than or equal to the first voltage.

In one example, the power tool system further comprises a first discharge module and a second discharge module. In the case where the first battery pack is used as a power source of the power tool, the first discharge module operates so that the power tool has first output performance; and in the case where the second battery pack is used as the power source of the power tool, the second discharge module operates so that the power tool has second output performance different from the first output performance.

In one example, the power tool further includes a power limiting module connected between the tool interface and the motor. In the case where the second rechargeable battery pack is connected through the tool interface, the power limiting module operates to limit an output current of the second rechargeable battery pack. In one example, a tool identification module includes a sensor. In one example, the second rechargeable battery pack includes a power limiting module connected in series with at least one of the plurality of first rechargeable cells and configured to limit one of an output power or current of the second rechargeable battery pack.

In one example, a power limiting module includes a semiconductor device.

In one example, the second rechargeable battery pack includes a plurality of sheet-shaped cells arranged in a stack.

In one example, an energy density of the second rechargeable battery pack is in a value range of greater than 200 Wh/kg.

In one example, the second rechargeable battery pack has a discharge capacity of at least 100 A.

In one example, in the case where the second battery pack is discharged at a rate of 10 C, a temperature rise is less than 45° C.

A rechargeable battery pack includes a battery pack interface, a cell assembly, and a power limiting module. The battery pack interface is configured for a connection to a power tool. The cell assembly includes a plurality of rechargeable cells connected in series, where the plurality of rechargeable cells are non-cylindrical. The power limiting module is connected in series with at least one of the plurality of rechargeable cells and configured to limit one of an output current or an output power of the battery pack according to different power tools connected through the battery pack interface.

In one example, the different power tools include a first power tool and a second power tool, where the first power tool has first output performance, and the second power tool has second output performance different from the first output performance.

In one example, the power limiting module is configured to increase an internal resistance of the rechargeable battery pack to limit one of the output current or the output power of the battery pack in the case where the rechargeable battery pack is connected to a first power tool and supplies power to the first power tool.

In one example, a power supply identification module is configured to identify one of a first power tool or a second power tool connected through the battery pack interface. A power supply control module is configured to receive an identification signal from the power supply identification module; in the case where the first power tool is connected through the battery pack interface, control the power limiting module to restrict the rechargeable battery pack to discharge at a first discharge current; and in the case where the second power tool is connected through the battery pack interface, control the rechargeable battery pack to discharge at a second discharge current greater than the first discharge current.

In one example, the rechargeable battery pack includes a plurality of sheet-shaped cells arranged in a stack.

In one example, an energy density of the rechargeable battery pack is in a value range of greater than 200 Wh/kg.

A power tool includes a motor, a tool interface, and a tool control module. The tool interface is configured for connections to different rechargeable battery packs. The tool control module is connected to at least the tool interface and configured to control output performance of the power tool according to one of the different battery packs connected through the tool interface.

In one example, the different rechargeable battery packs include a first rechargeable battery pack and a second rechargeable battery pack. The first rechargeable battery pack includes a plurality of first rechargeable cells, where the plurality of first rechargeable cells are cylindrical. The second rechargeable battery pack includes a plurality of second rechargeable cells different from the plurality of first rechargeable cells. An internal resistance of each of the plurality of second rechargeable cells is less than an internal resistance of each of the plurality of first rechargeable cells.

In one example, the power tool includes a tool identification module. The tool identification module is configured to identify one of a first rechargeable battery pack or a second rechargeable battery pack connected through the tool interface. The tool control module is configured to receive an identification signal from the tool identification module; in the case where the first rechargeable battery pack is connected through the tool interface, cause the power tool to have first output performance; and in the case where the second rechargeable battery pack is connected through the tool interface, cause the power tool to have second output performance different from the first output performance.

In one example, the power tool includes a tool identification module. The tool identification module is configured to identify one of a first rechargeable battery pack or a second rechargeable battery pack connected through the tool interface. The tool control module is configured to receive an identification signal from the tool identification module; in the case where the first rechargeable battery pack is connected through the tool interface, control the first rechargeable battery pack to discharge at a first discharge current; and in the case where the second rechargeable battery pack is connected through the tool interface, control the second rechargeable battery pack to discharge at a second discharge current which is not greater than the first discharge current.

In one example, the power tool includes a tool identification module. The tool identification module is configured to identify one of a first rechargeable battery pack or a second rechargeable battery pack connected through the tool interface. The tool control module is configured to receive an identification signal from the tool identification module; in the case where the first rechargeable battery pack is connected through the tool interface, control the first rechargeable battery pack to output electric power at a first voltage; and in the case where the second rechargeable battery pack is connected through the tool interface, control the second rechargeable battery pack to output electric power at a second voltage, where the second voltage is greater than or equal to the first voltage.

In one example, the power tool further includes a power limiting module connected between the tool interface and the motor. In the case where the second rechargeable battery pack is connected through the tool interface, the power limiting module operates to limit an output current of the second rechargeable battery pack.

The present application adopts the preceding technical solutions so that the compatibility of the battery pack can be improved, thereby expanding the usage scenarios of the battery pack.

A charging system includes a first rechargeable battery pack, a second rechargeable battery pack, and a charger. The first rechargeable battery pack includes a plurality of first rechargeable cells, where the plurality of first rechargeable cells are cylindrical. The second rechargeable battery pack includes a plurality of second rechargeable cells each with a different shape from each of the plurality of first rechargeable cells. The charger is configured to charge the first rechargeable battery pack or the second rechargeable battery pack. The second rechargeable battery pack has different charging performance from the first rechargeable battery pack.

In one example, the charger includes a charging interface. The first rechargeable battery pack has a first interface adaptable to the charging interface, the second rechargeable battery pack has a second interface adaptable to the charging interface, and a shape of the first interface is basically the same as a shape of the second interface.

In one example, the charging performance includes at least one of the following electrical parameters: a charge current or a charge voltage.

In one example, the first rechargeable battery pack has a first internal resistance, and the second rechargeable battery pack has a second internal resistance, where the second internal resistance is less than the first internal resistance.

In one example, the charger includes a charging identification module and a charging control module. The charging identification module is configured to identify one of the first rechargeable battery pack or the second rechargeable battery pack connected through the charging interface. The charging control module is configured to receive an identification signal from the charging identification module; in the case where the charger is connected to the first rechargeable battery pack, control the charger to charge at a first charge current; and in the case where the charger is connected to the second rechargeable battery pack, control the charger to charge at a second charge current, where the second charge current is greater than the first charge current.

In one example, the charger further includes a current control module connected between a charging interface and a power supply module. In the case where the first rechargeable battery pack is connected through the charging interface, the current control module operates to limit an output current of the charger.

In one example, the second rechargeable battery pack has a charge current of greater than or equal to 80 A.

A charging system includes a first rechargeable battery pack, a second rechargeable battery pack, and a charger. The first rechargeable battery pack includes a plurality of first rechargeable cells, where the plurality of first rechargeable cells are cylindrical. The second rechargeable battery pack includes a plurality of second rechargeable cells each with a different shape from each of the plurality of first rechargeable cells. The charger is configured to charge the first rechargeable battery pack and/or the second rechargeable battery pack. The first rechargeable battery pack is connected to the charger and charged at a first current; and the second rechargeable battery pack is connected to the charger and charged at a second current.

A rechargeable battery pack includes a battery pack interface, a cell group, and a current control module. The battery pack interface is configured for a connection to a charger. The cell group includes a plurality of rechargeable cells connected in series, where the plurality of rechargeable cells are non-cylindrical. The current control module is connected in series with at least one of the plurality of rechargeable cells and configured to limit a charge current of the cell group according to different chargers connected through the battery pack interface.

In one example, the different chargers include a first charger and a second charger, where the first charger has first charging performance, and the second charger has second charging performance different from the first charging performance.

8

Figure 12:
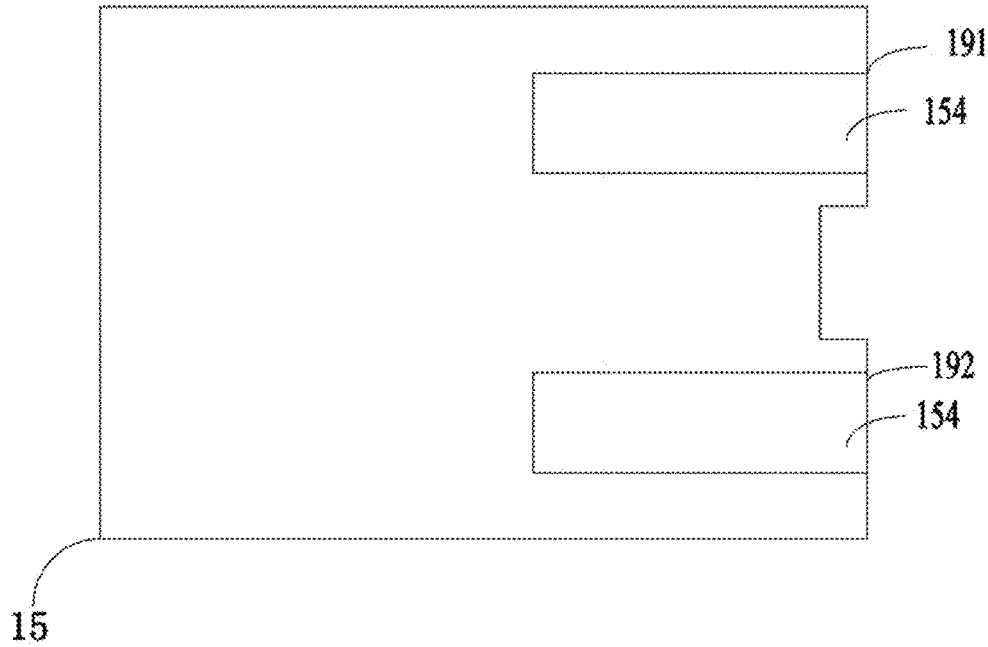
Figure 13:
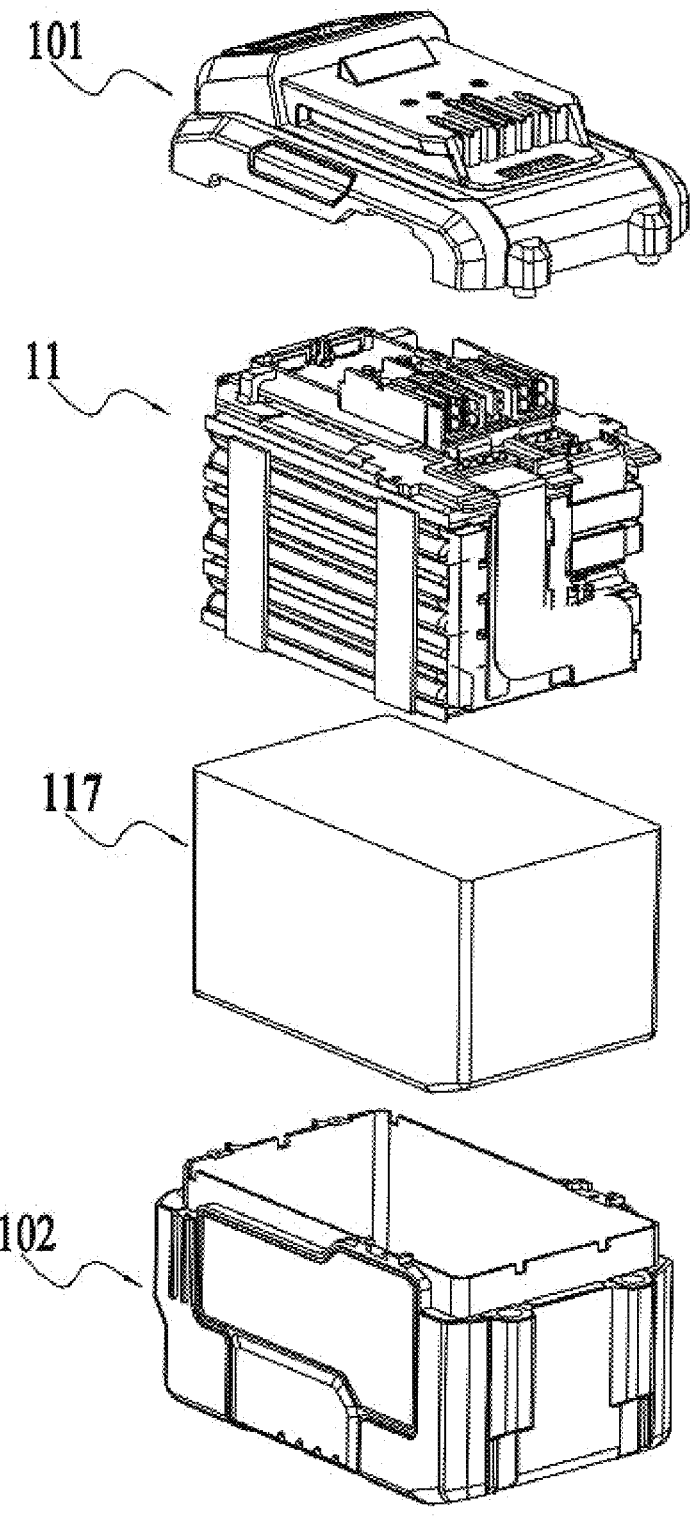
Figure 14:
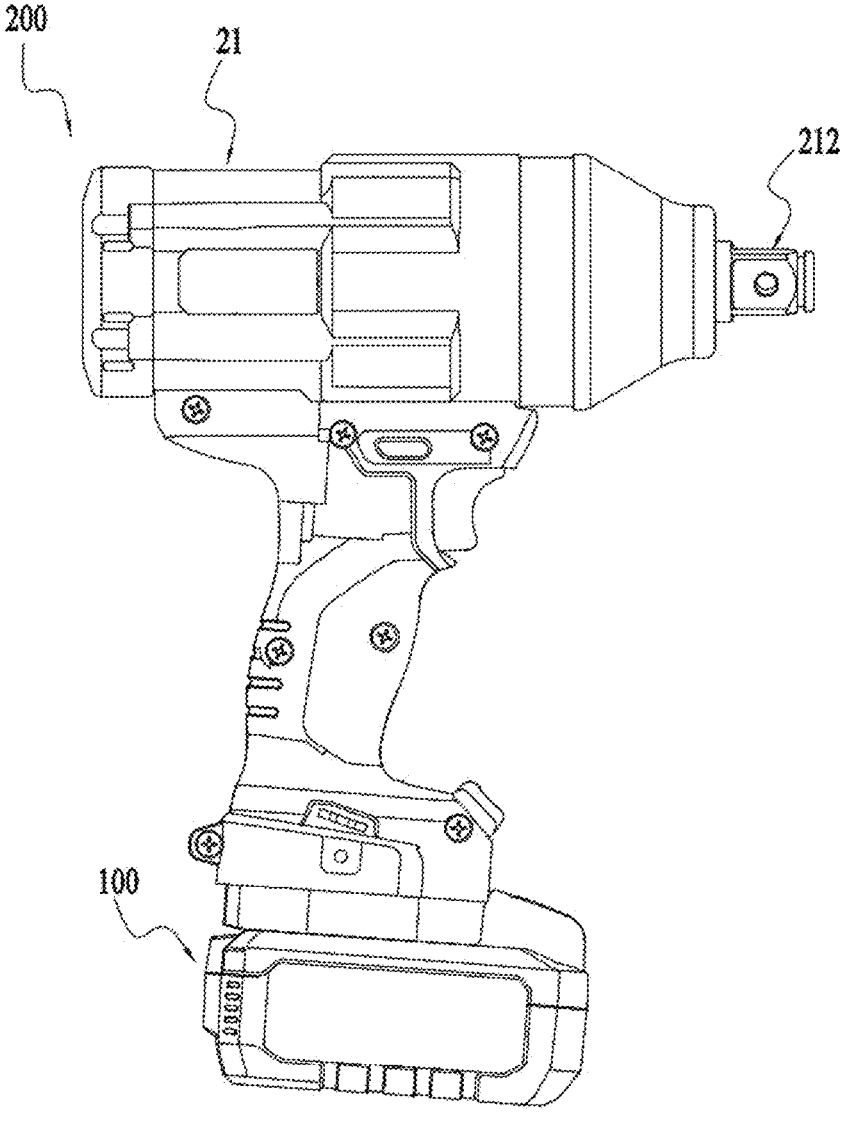
Figure 15:
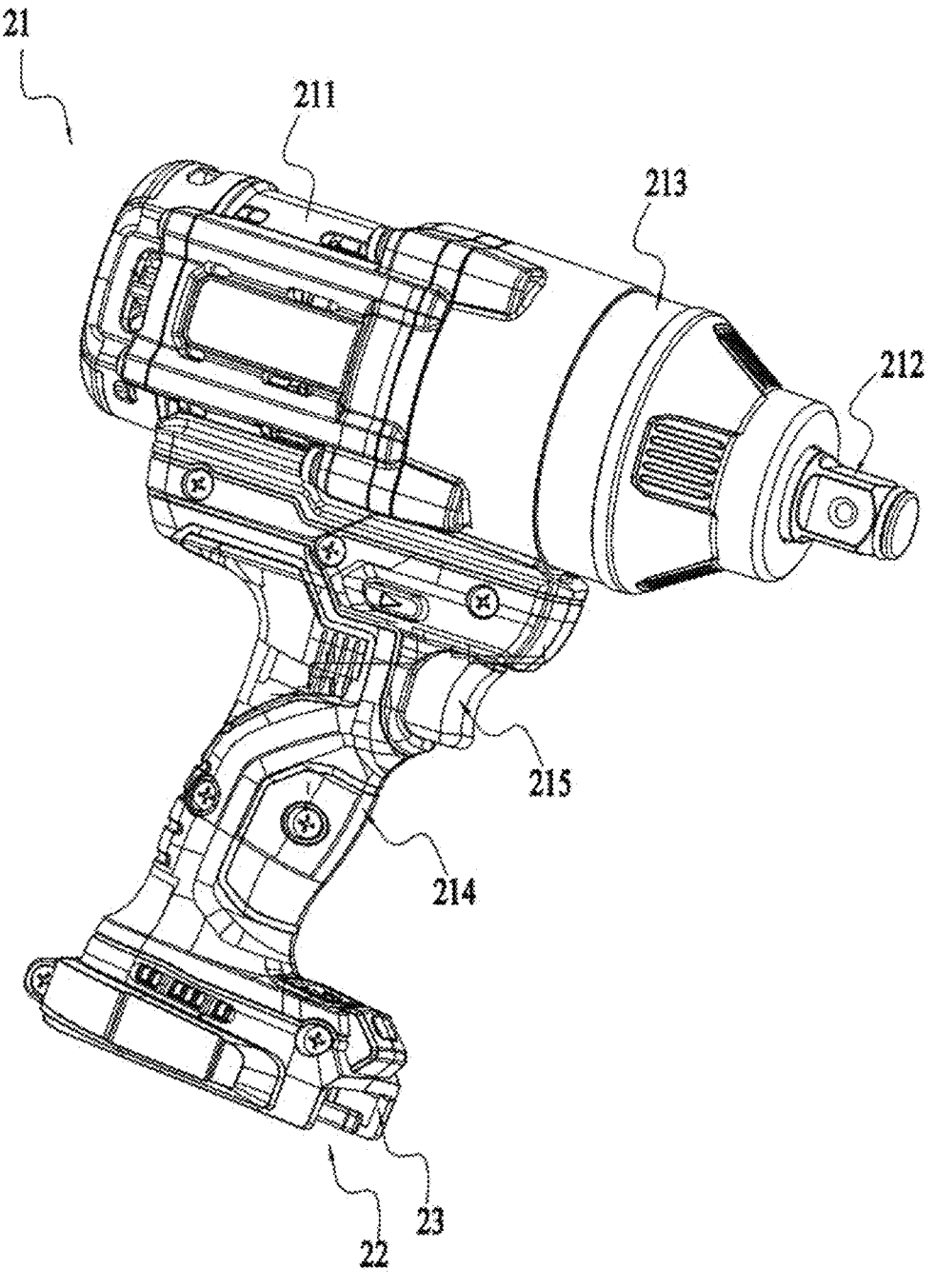
Figure 16:
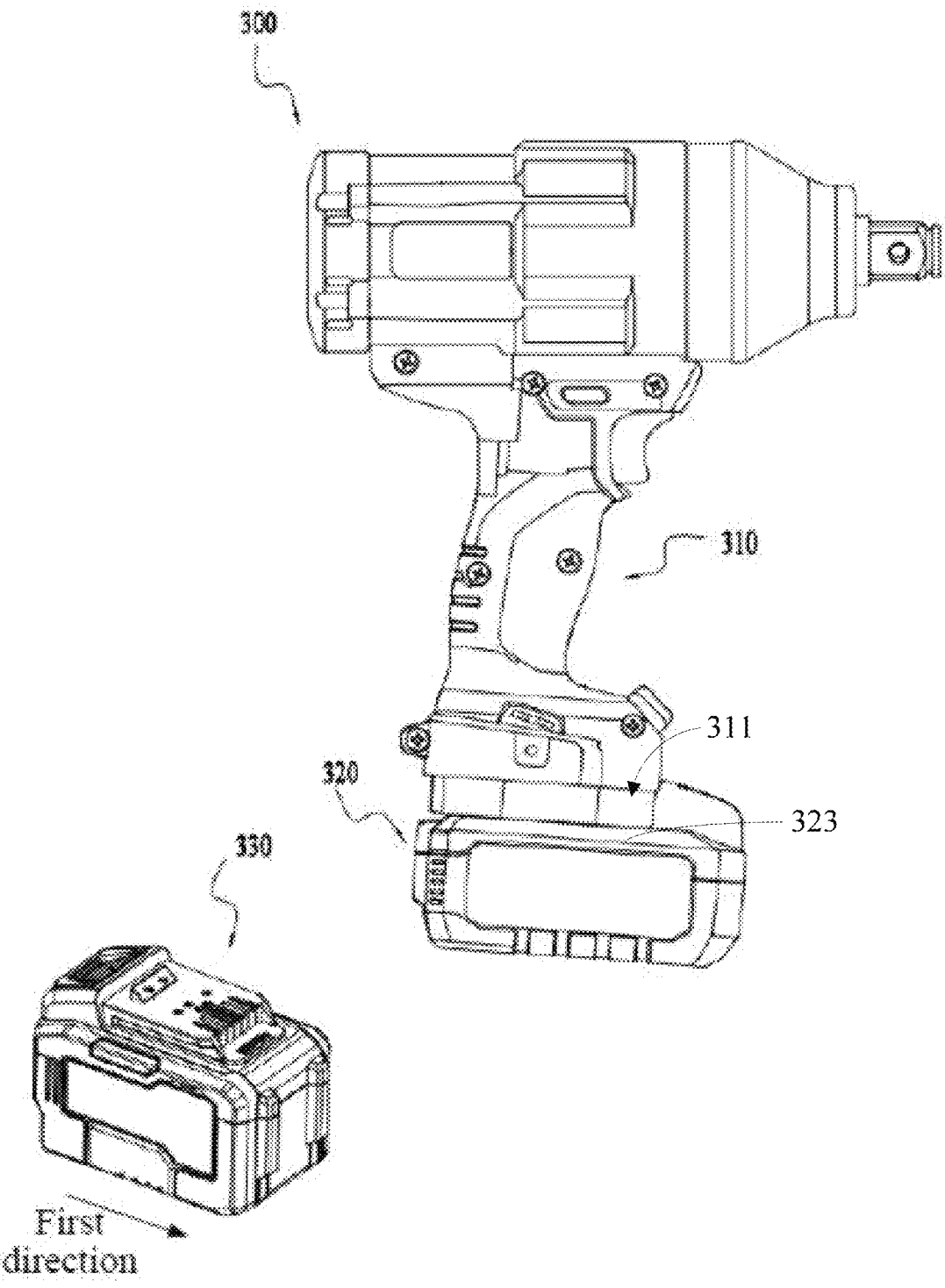
Figure 17:
Figure 17:
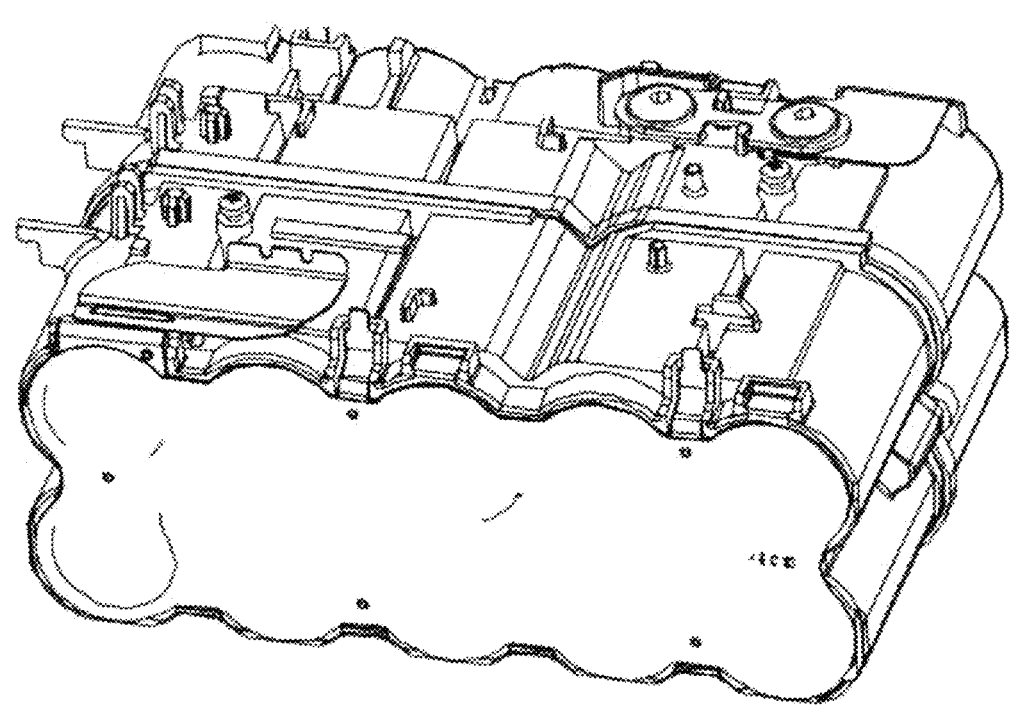
Figure 18:
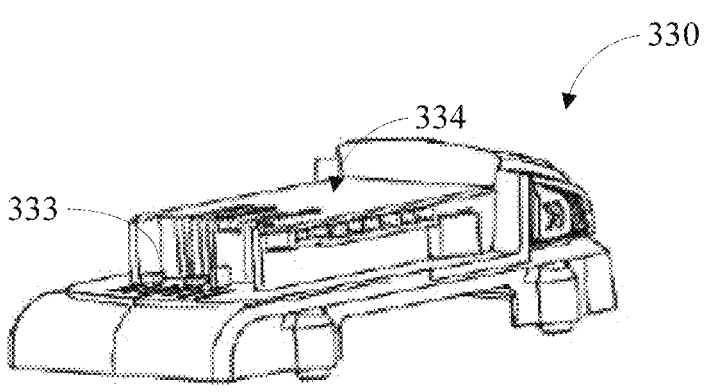
Figure 18:
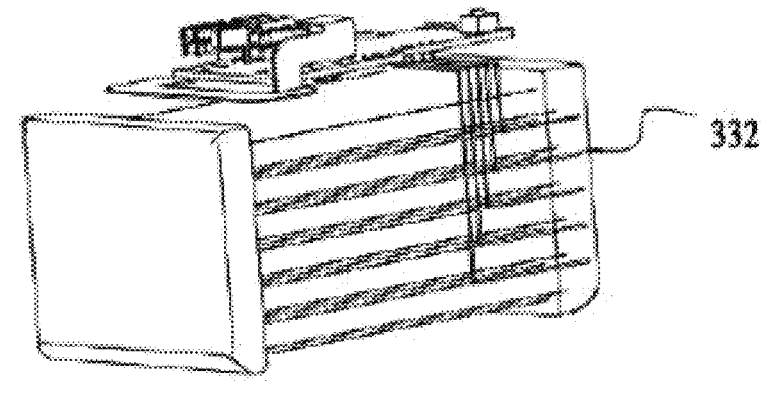
Figure 18:
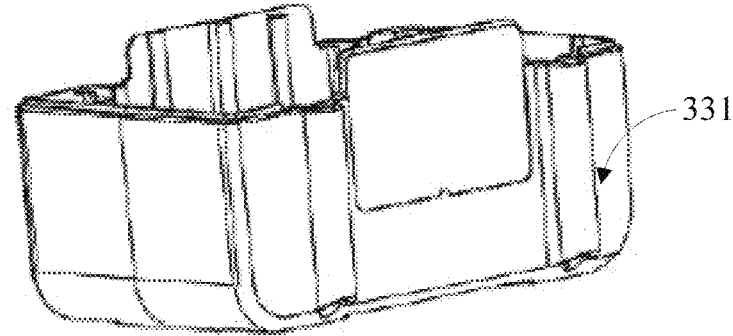
Figure 19:
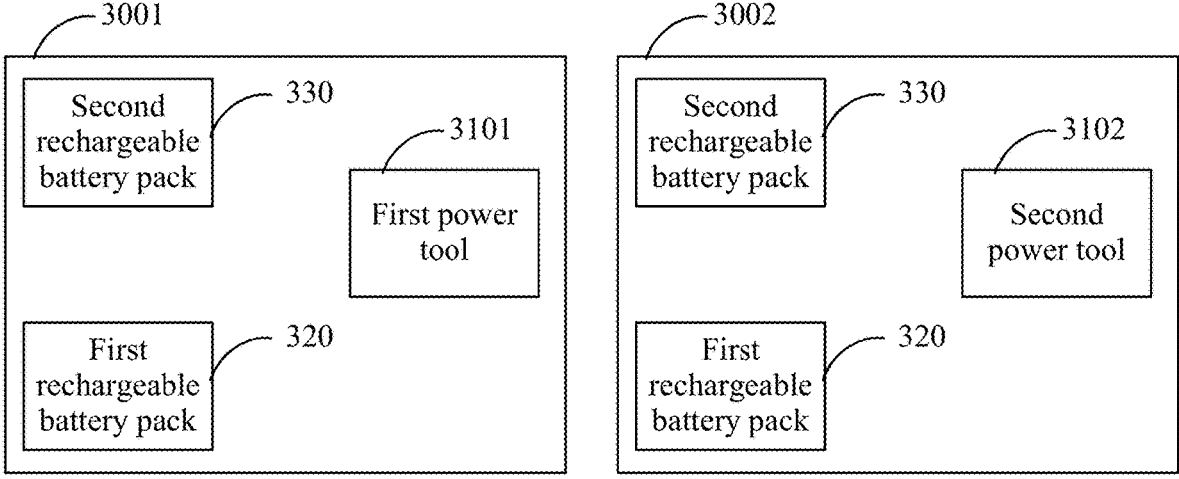
Figure 20:
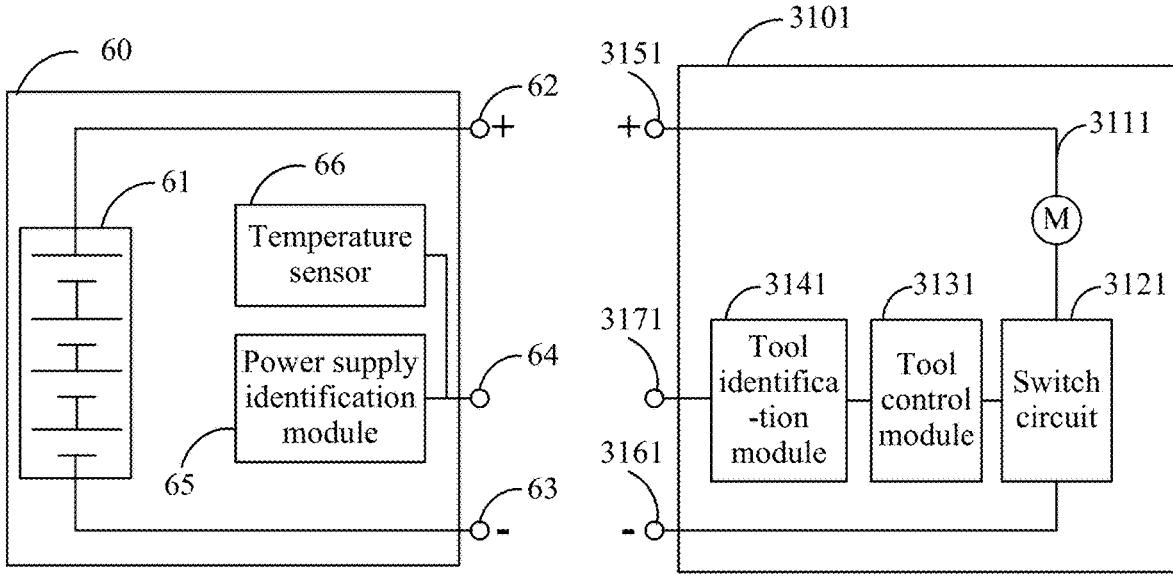
Figure 21:
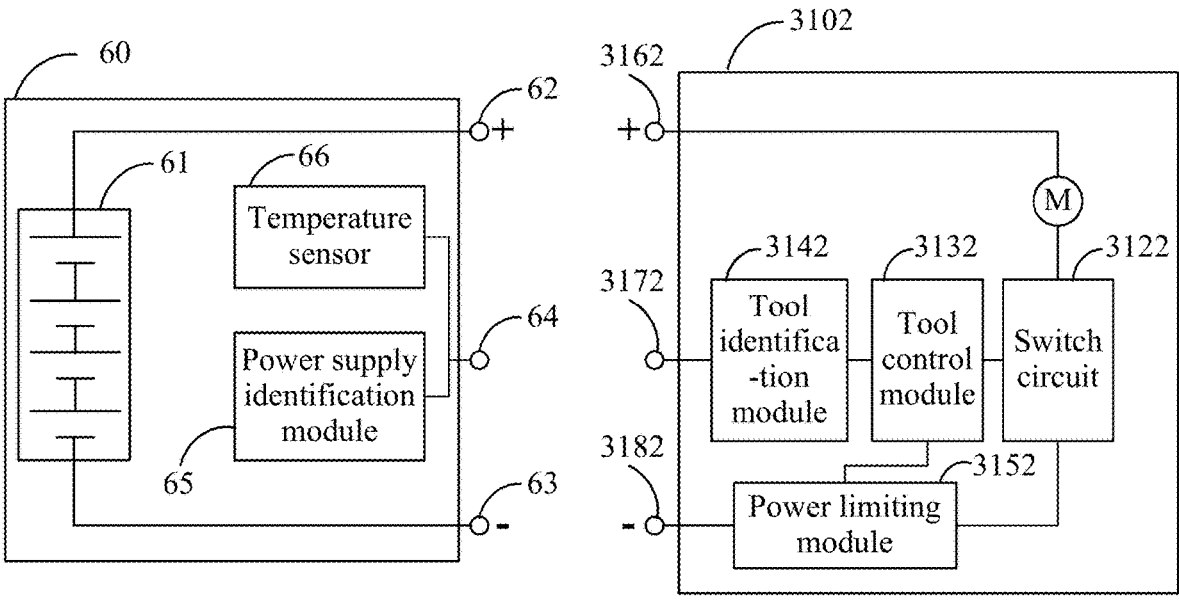
Figure 22:
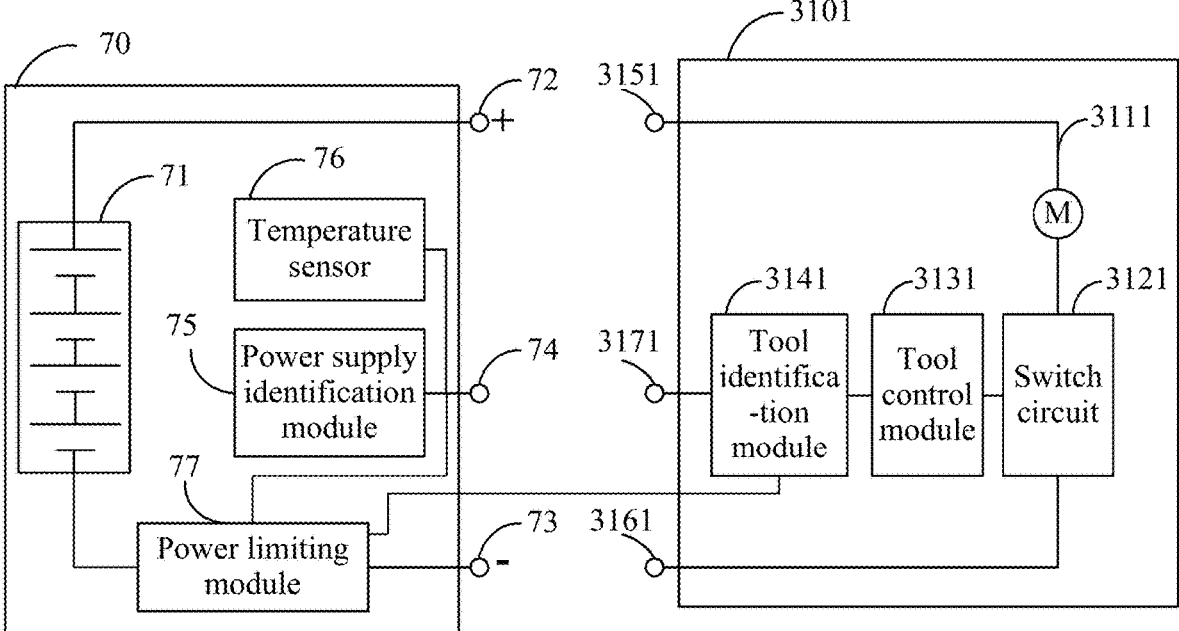
Figure 23:
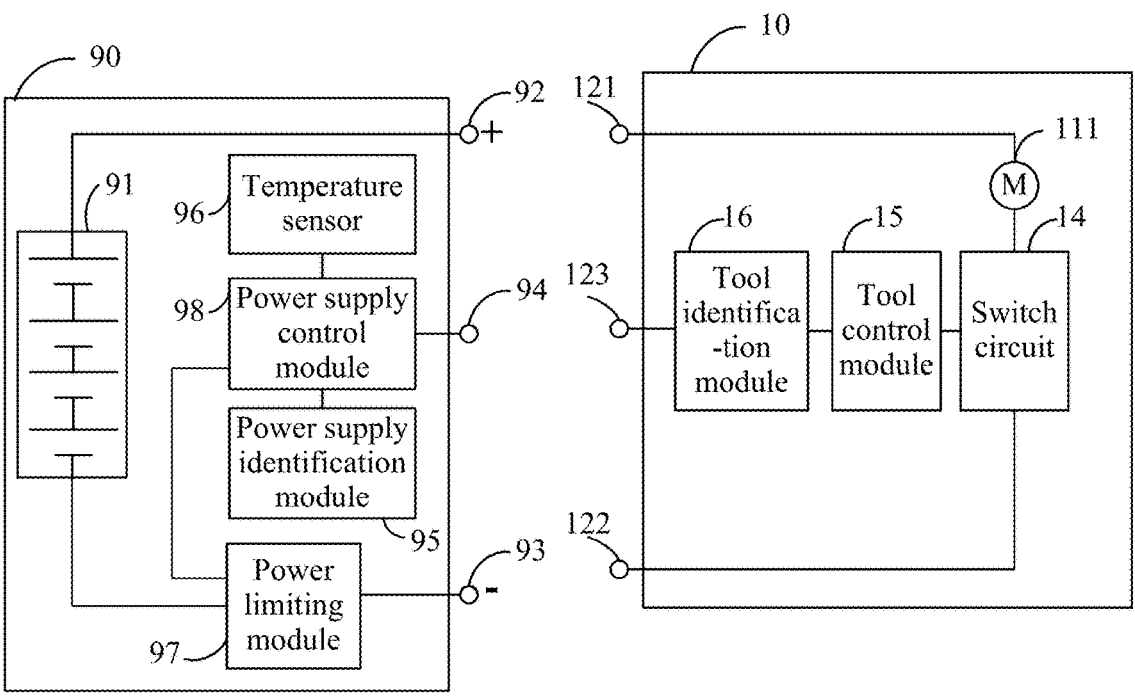
Figure 24:
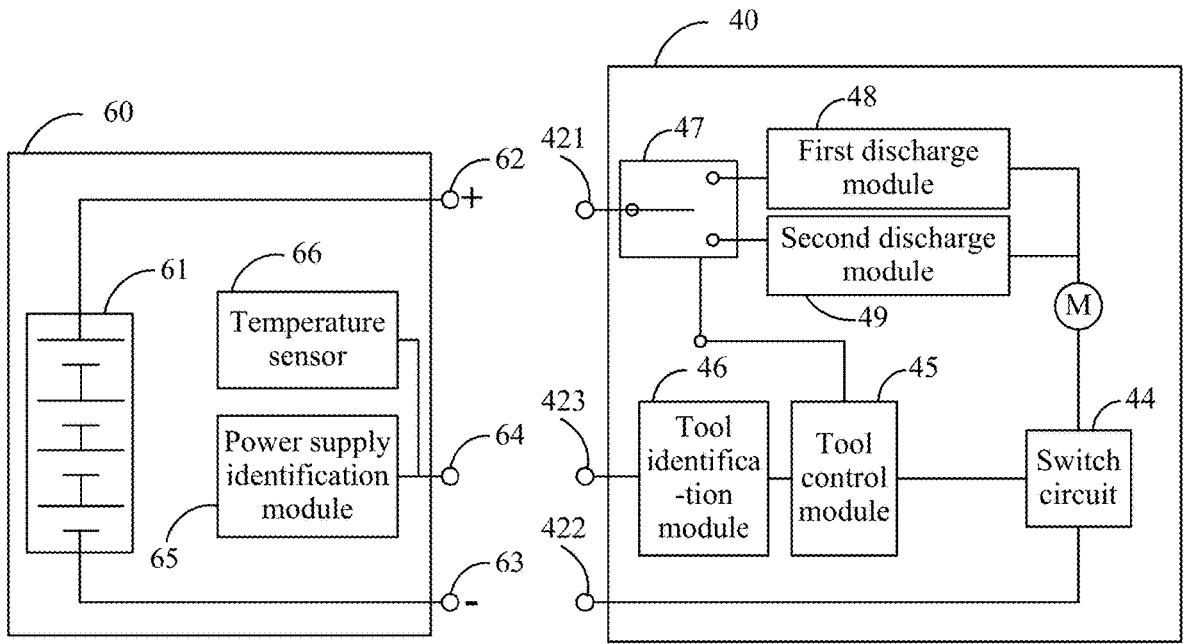
Figure 25:
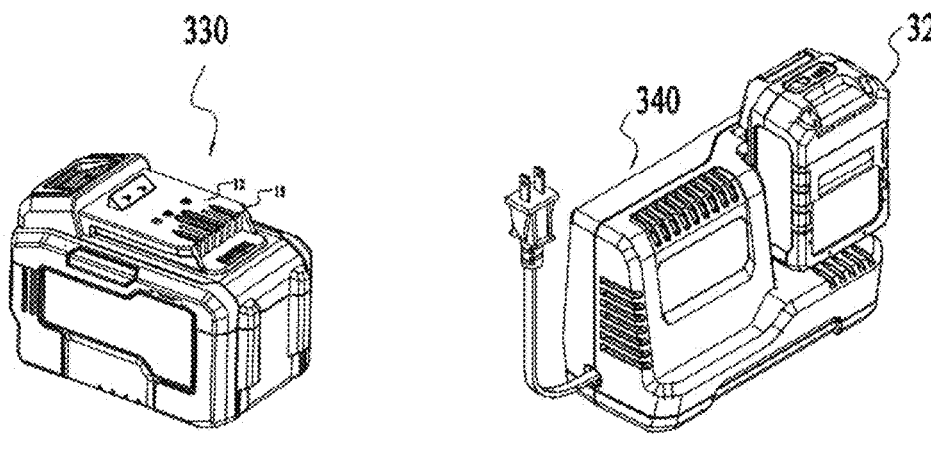
Figure 26:
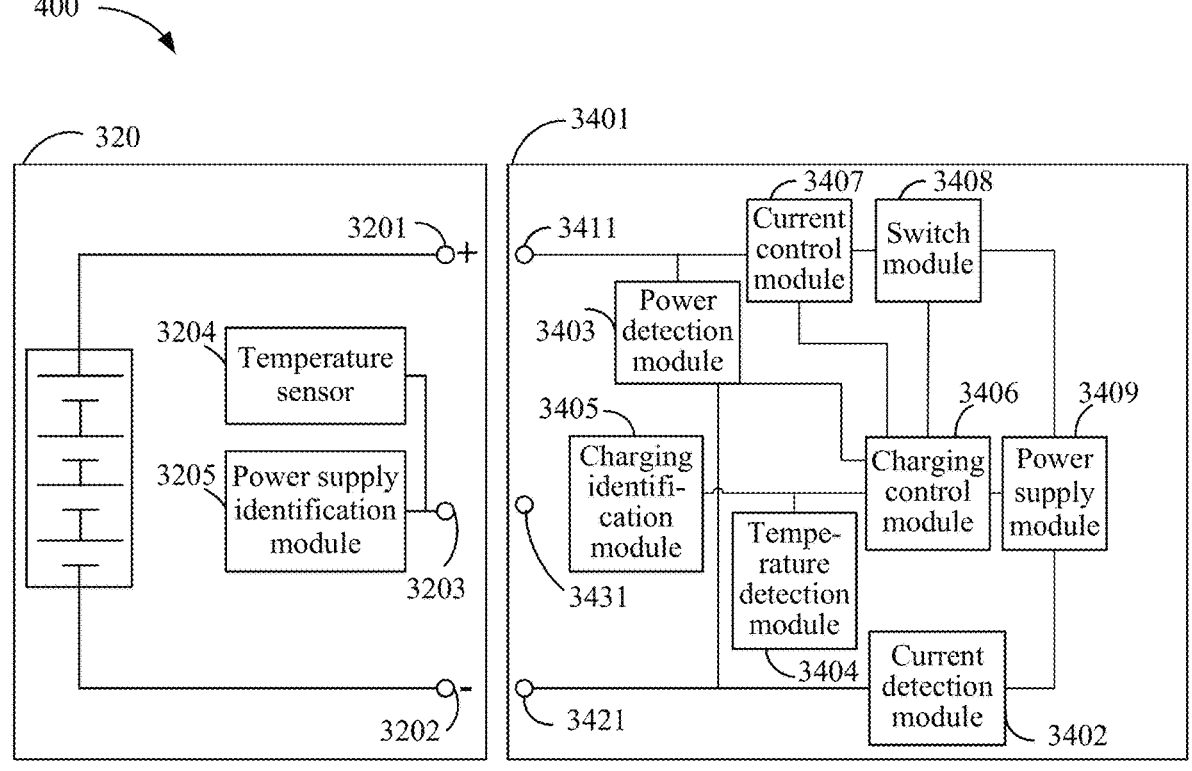
Figure 27:
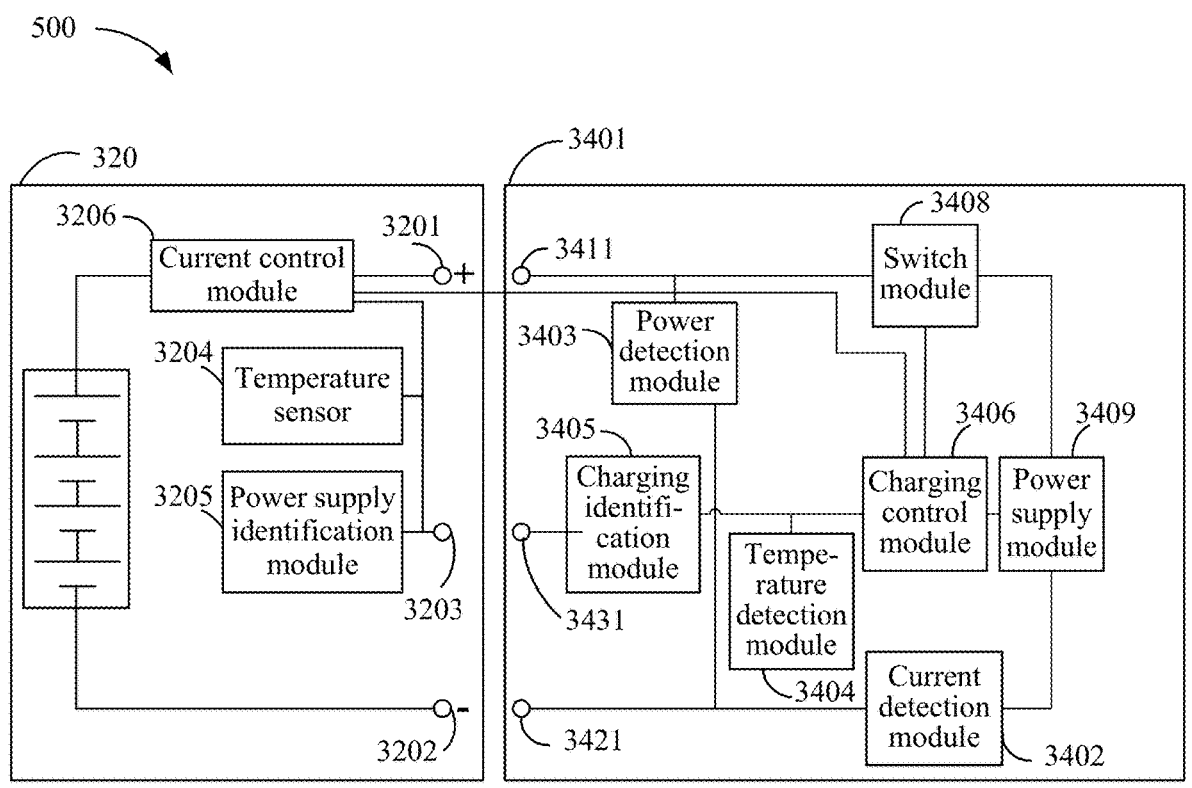
Figure 28:
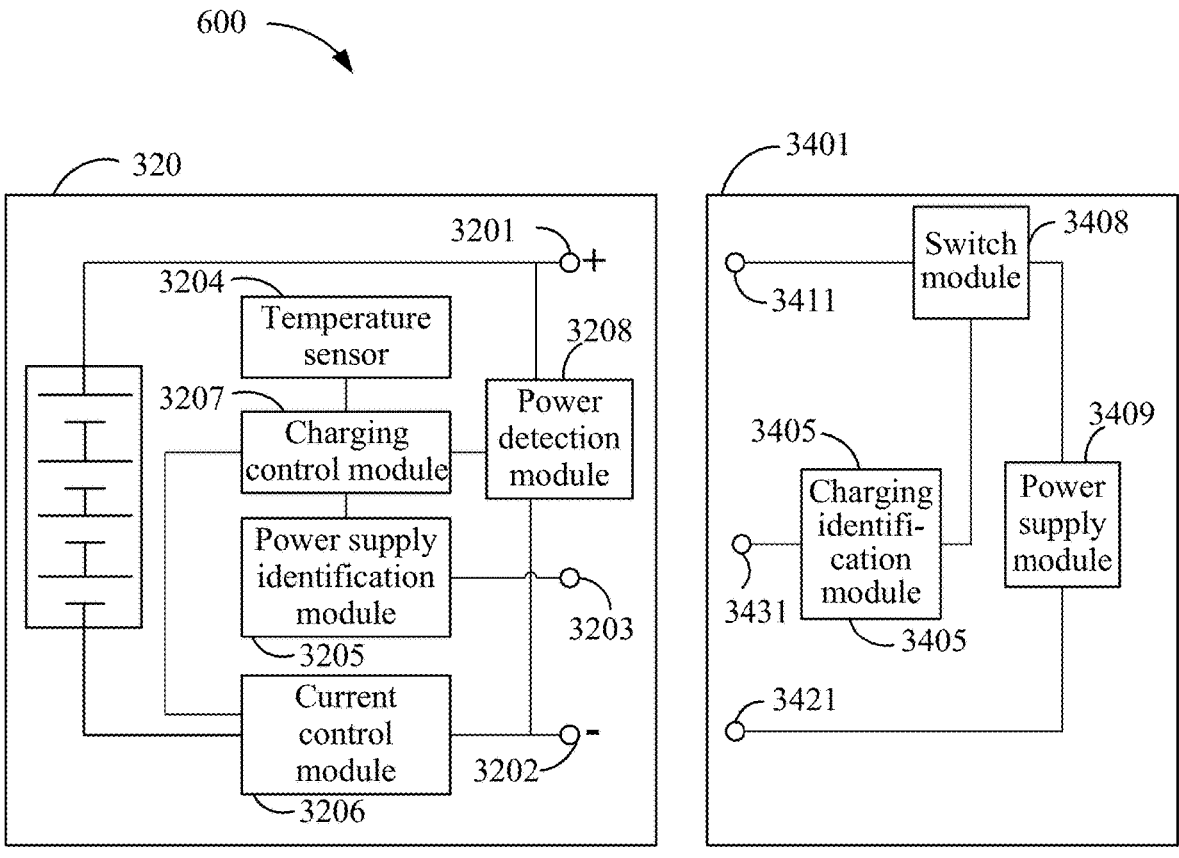

FIG. 12 is a schematic view of projections of a positive electrode connection piece, a negative electrode connection piece, and a circuit board in an up-and-down direction as an example;

FIG. 13 is a structural view of a battery pack as an example;

FIG. 14 is a structural view of a battery pack and a power tool using the battery pack;

FIG. 15 is a structural view of the power tool in FIG. 14;

FIG. 16 is a structural view of a power tool system;

FIG. 17 is a structural view of a first rechargeable battery pack in the power tool system in FIG. 16;

FIG. 18 is a structural view of a second rechargeable battery pack in the power tool system in FIG. 16;

FIG. 19 is a diagram of modules of a first power tool system and a second power tool system;

FIG. 20 is a circuit block diagram of a first power tool and a rechargeable battery pack as an example;

FIG. 21 is a circuit block diagram of a second power tool and a rechargeable battery pack as an example;

FIG. 22 is a circuit block diagram of a power tool and a rechargeable battery pack as an example;

FIG. 23 is a circuit block diagram of a power tool and another rechargeable battery pack as an example;

FIG. 24 is a circuit block diagram of a power tool and a rechargeable battery pack as another example;

FIG. 25 is a structural view of a charging system;

FIG. 26 is a circuit block diagram of a rechargeable battery pack and a charger as an example;

FIG. 27 is a circuit block diagram of a rechargeable battery pack and a charger as another example; and FIG. 28 is a circuit block diagram of a rechargeable battery pack and a charger as another example.

DETAILED DESCRIPTION

The present application is described below in detail in conjunction with drawings and examples.

Figure 1:
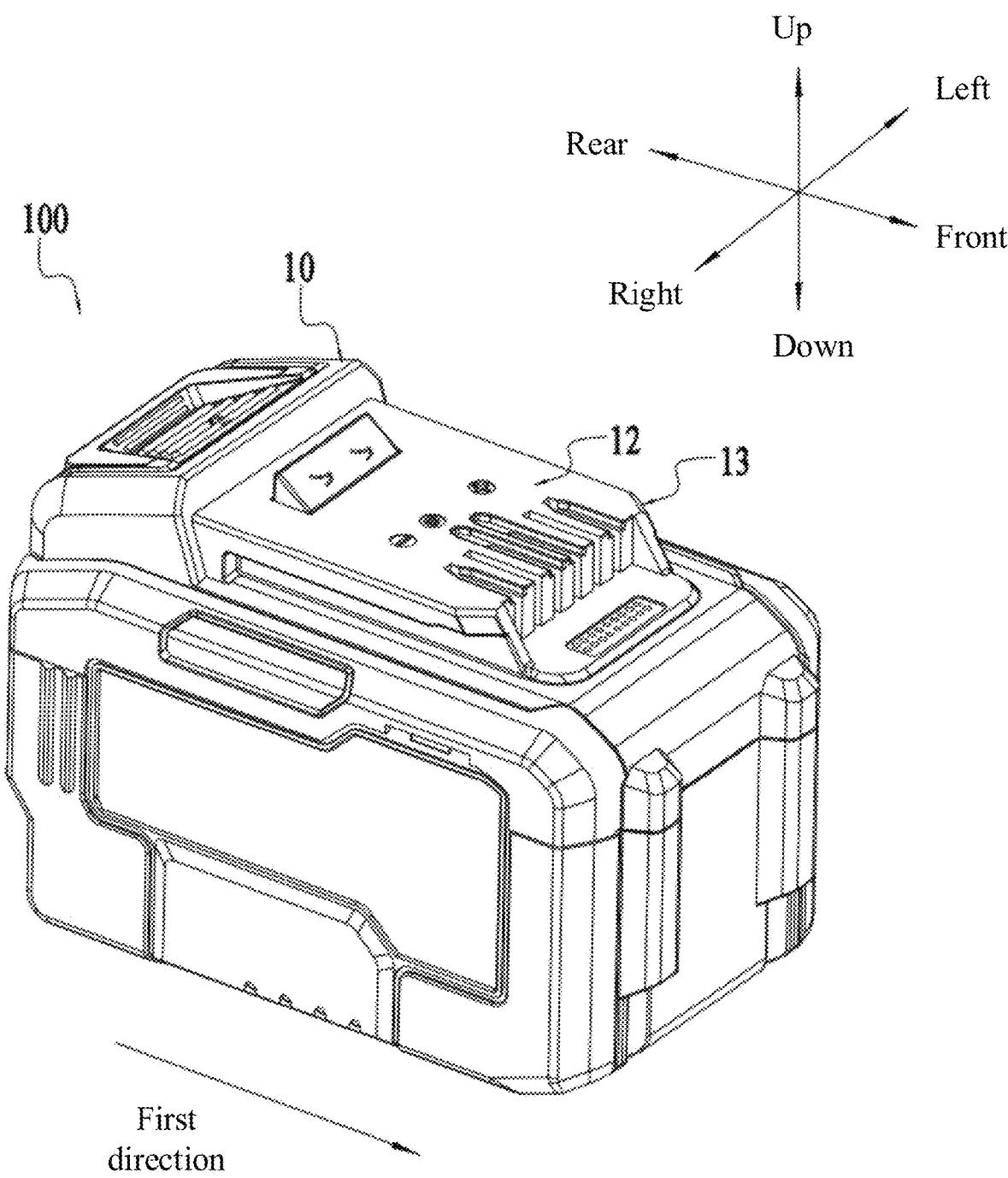
FIG. 1 is a structural view of a battery pack as an example.
Figure 2:
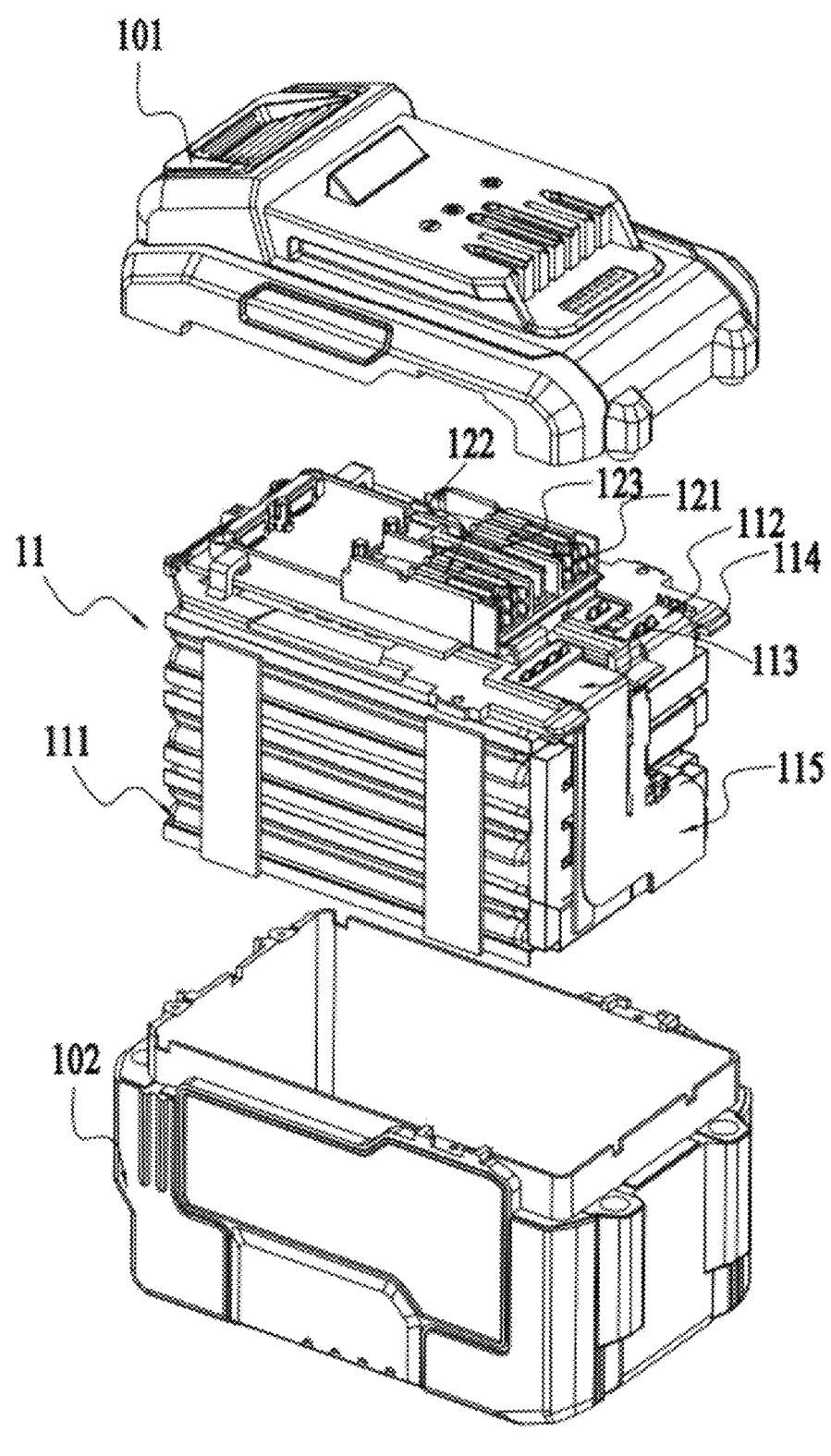
FIG. 2 is a structural view of a battery pack as an example.

As shown in FIGS. 1 and 2, a battery pack 100 includes a housing 10, a cell assembly 11, and a battery pack interface 12. A voltage of the battery pack 100 is generally 10.8 V, 24 V, 36 V, 48 V, 56 V, or 80 V. To facilitate the description of technical solutions in the present application, a front side, a rear side, a left side, a right side, an upper side, and a lower side shown in FIG. 1 are further defined.

The housing 10 includes an upper housing 101 and a lower housing 102 assembled at an interface to form an inner cavity. The housing 10 is made of a first material. Specifically, the first material is a thermoplastic material such as polyethylene plastic and polyvinyl chloride plastic. The upper housing 101 and the lower housing 102 are assembled into the housing 10 so as to form the inner cavity for accommodating the cell assembly 11. The housing 10 is at least partially formed with a battery pack coupling portion 13 configured to connect the battery pack 100 to a power tool, and the battery pack 100 can be connected to the power tool along a first direction. Specifically, the battery pack coupling portion 13 is formed on an upper surface of the housing 10, and the battery pack coupling portion 13 can mate with a tool mating portion of the power tool so that the battery pack 100 can be detachably attached to the power tool along an installation direction. In some examples, the battery pack coupling portion 13 is provided with a pair of guide rails.

The cell assembly 11 is disposed in the inner cavity formed by the housing 10. The cell assembly 11 includes multiple non-cylindrical cell units 111, where the multiple cell units 111 are connected in series, in parallel, or in series and in parallel to form the cell assembly 11. In some examples, a voltage of a single cell unit 111 is 4.2 V. The cell assembly 11 further includes a positive terminal 112 of the cell assembly and a negative terminal 113 of the cell assembly. The positive terminal 112 of the cell assembly is connected to at least a positive electrode of the cell unit; and the negative terminal 113 of the cell assembly is connected to at least a negative electrode of the cell unit. The positive terminal 112 of the cell assembly and the negative terminal 113 of the cell assembly are disposed on the same side of the battery pack 100. Specifically, the positive electrode of the cell unit and the negative electrode of the cell unit are disposed on the same side of the battery pack 100. In some examples, the positive electrode of the cell unit and the negative electrode of the cell unit are disposed on a front end surface of the battery pack 100. In some other examples, the positive electrode of the cell unit and the negative electrode of the cell unit are disposed on a rear end surface of the battery pack 100. In some examples, the cell unit 111 is a flat pouch-like structure, and the multiple cell units 111 are stacked sequentially along an up-and-down direction. The cell unit 111 may also be bent into an arc, for example, in a pouch-type battery pack. The cell unit 111 further includes a cell housing, and generally an aluminum plastic film is used as the cell housing. It is to be understood that the present application is not limited to the examples described herein, and the structure of a cell unit is not limited herein.

In some examples, an energy density (energy/mass of the battery pack) of the cell assembly 11 is in a value range of greater than 150 Wh/kg. Optionally, the energy density (energy/mass of the battery pack) of the cell assembly 11 is in a value range of greater than 200 Wh/kg. Optionally, the energy density (energy/mass of the battery pack) of the cell assembly 11 is in a value range from 150 Wh/kg to 200 Wh/kg. Optionally, the energy density (energy/mass of the battery pack) of the cell assembly 11 is in a value range from 200 Wh/kg to 250 Wh/kg. Optionally, the energy density (energy/mass of the battery pack) of the cell assembly 11 is in a value range from 250 Wh/kg to 300 Wh/kg. Optionally, the energy density (energy/mass of the battery pack) of the cell assembly 11 is in a value range from 300 Wh/kg to 450 Wh/kg.

In some examples, an internal resistance of the cell unit of the battery pack 100 is less than or equal to 10 mΩ. Optionally, the internal resistance of the cell of the battery pack 100 is less than or equal to 6 mΩ. Optionally, the internal resistance of the cell of the battery pack 100 is less than or equal to 3 mΩ.

In some examples, the battery pack 100 has a discharge current of greater than or equal to 80 A. Optionally, the battery pack 100 has a discharge current of greater than or equal to 100 A. Optionally, the battery pack 100 has a discharge current of greater than or equal to 80 A.

The battery pack interface 12 is formed on the upper surface of the housing 10, electrically connected to at least the cell assembly 11, and configured to establish a physical and electrical connection with the power tool. The battery pack interface 12 includes a power supply positive interface, a power supply negative interface, and a power supply communication interface. The battery pack outputs electric power through the power supply positive interface and the power supply negative interface, and the battery pack communicates through the power supply communication interface with the power tool or a charger attached to the battery pack. In an example, six battery pack interfaces 12 are provided on the housing. It is to be understood that more or fewer battery pack interfaces 12 may be provided on the housing 10 of the battery pack 100 according to an electrical characteristic of the battery pack.

The battery pack interface 12 is further provided with a positive terminal 121 of the battery pack, a negative terminal 122 of the battery pack, and a communication terminal 123 of the battery pack. The positive terminal 121 of the battery pack is electrically connected to the positive terminal 112 of the cell assembly and disposed in the power supply positive interface; the negative terminal 122 of the battery pack is electrically connected to the negative terminal 113 of the cell assembly and disposed in the power supply negative interface. The positive terminal 121 of the battery pack and the negative terminal 122 of the battery pack are configured to mate with tool terminals of the power tool so as to output electric power of the cell assembly 11 to the power tool. Specifically, the electric power of the cell assembly 11 reaches the power tool through the positive terminal 112 of the cell assembly and the positive terminal 121 of the battery pack and returns to the cell assembly 11 through the negative terminal 122 of the battery pack and the negative terminal 113 of the cell assembly. Therefore, the cell assembly 11, the positive terminal 112 of the cell assembly, the positive terminal 121 of the battery pack, the negative terminal 122 of the battery pack, the negative terminal 113 of the cell assembly, and the power tool form a current loop. Moreover, the communication terminal 123 of the battery pack is disposed in the power supply communication interface and configured for communication with the connected power tool or charger. As an example of specific structures of the positive terminal 121, the negative terminal 122, and the communication terminal 123 of the battery pack, the positive terminal 121, the negative terminal 122, and the communication terminal 123 of the battery pack clamp the tool terminals by an elastic force from two sides in a left-and-right direction, respectively. Therefore, the tool terminals of the power tool are guided by the battery pack interface 12 of the battery pack to be inserted into the positive terminal 121 of the battery pack and the negative terminal 122 of the battery pack during the process of installing the battery pack to the power tool so that the tool terminals are clamped by the positive terminal and the negative terminal, and the power tool is electrically connected to the battery pack 100.

In some examples, the positive terminal 112 of the cell assembly is connected in series between a positive electrode of at least one cell unit and the positive terminal 121 of the battery pack; and the negative terminal 113 of the cell assembly is connected in series between a negative electrode of at least one cell unit and the negative terminal 122 of the battery pack. The cell assembly 11 further includes a positive lead-out piece 114 and a negative lead-out piece 115, where the positive lead-out piece 114 connects the positive terminal 112 of the cell assembly to the positive electrode of the cell unit, and the negative lead-out piece 115 connects the negative terminal 113 of the cell assembly to the negative electrode of the cell unit. To prevent the temperature of the positive lead-out piece 114 from rising sharply when the battery pack 100 outputs a large discharge current, the positive lead-out piece 114 is a metal sheet with a certain width. In this manner, a heat dissipation effect of the positive lead-out piece 114 is improved, thereby reducing the heat generation of the battery pack 100 in use, improving the safety and reliability of the battery pack 100, and prolonging the service life of the battery pack 100. Specifically, a width of the positive lead-out piece 114 is in an interval of 5 mm to 40 mm, and a thickness of the positive lead-out piece 114 is in an interval of 0.3 mm to 1.5 mm. Optionally, the width of the positive lead-out piece 114 is in an interval of 6 mm to 35 mm.

In some other examples, the negative lead-out piece 115 of the battery pack 100 is a metal sheet with a certain width so that a heat dissipation effect of the negative lead-out piece 115 is improved, thereby reducing the heat accumulation of the battery pack 100 in use, improving the safety and reliability of the battery pack 100, and prolonging the service life of the battery pack 100. A width of the negative lead-out piece 115 is in an interval of 5 mm to 40 mm, and a thickness of the negative lead-out piece 115 is in an interval of 0.3 mm to 1.5 mm. Optionally, the width of the negative lead-out piece 115 is in an interval of 6 mm to 35 mm. It is to be understood that to improve the heat dissipation effect, the positive lead-out piece 114 and the negative lead-out piece 115 of the battery pack 100 may each be the metal sheet with a certain width. In this example, since the positive terminal 112 of the cell assembly and the negative terminal 113 of the cell assembly are disposed on the same side of the battery pack 100 and the multiple cell units 111 included in the cell assembly 11 are connected in series, a length of the positive lead-out piece 114 is different from a length of the negative lead-out piece 115.

Figure 3:
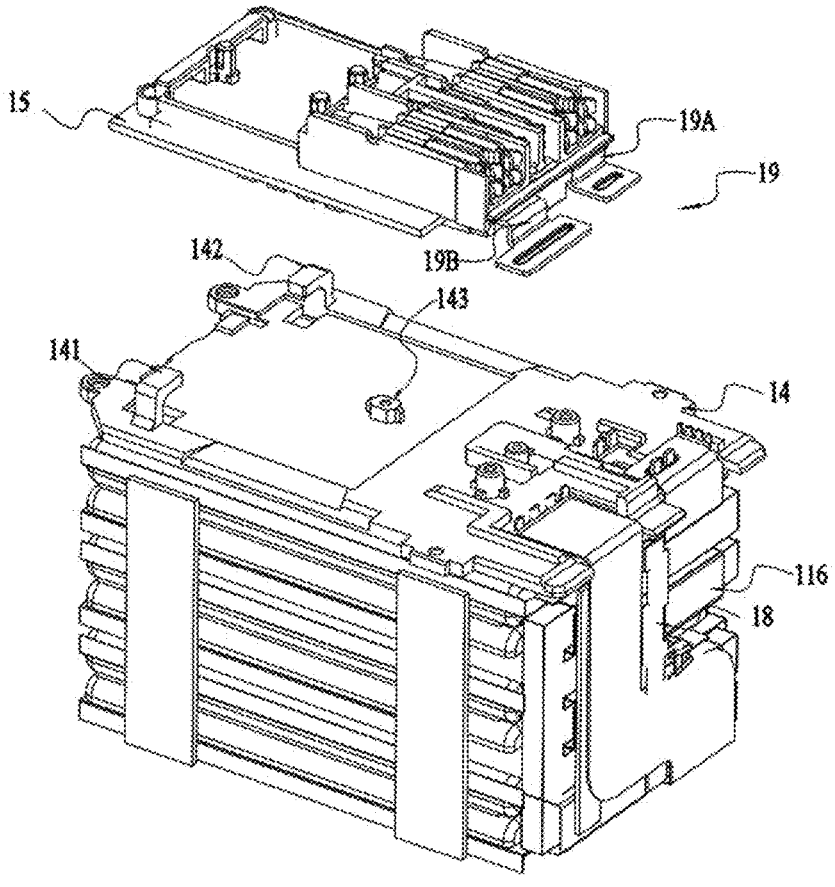
FIG. 3 is a schematic view illustrating an internal structure of the battery pack shown in FIG. 1 with a housing removed.

Referring to FIG. 3, the cell assembly 11 further includes a cell connection piece 116, where the cell connection piece 116 is configured to connect adjacent cell units 111. Specifically, the cell connection piece 116 is connected to a positive electrode of one cell unit and a negative electrode of another cell unit, and the cell assembly 11 includes multiple cell connection pieces 116 so that the cell units 111 are connected in series. Moreover, the cell connection piece 116 has the same width as the positive lead-out piece 114 and/or the negative lead-out piece 115 so that a heat dissipation effect of the cell connection piece 116 is improved, thereby reducing the heat accumulation of the battery pack 100 in use, improving the safety and reliability of the battery pack 100, and prolonging the service life of the battery pack. In an example, the cell assembly 11 includes at least a first cell and a second cell connected in series, where a negative electrode of the first cell is electrically connected to the negative lead-out piece 115, and a positive electrode of the second cell is electrically connected to the positive lead-out piece 114. Correspondingly, the cell assembly 11 further includes at least one cell connection piece 116 connected to a positive electrode of the first cell and a negative electrode of the second cell so that the first cell and the second cell are connected in series.

Figure 4:
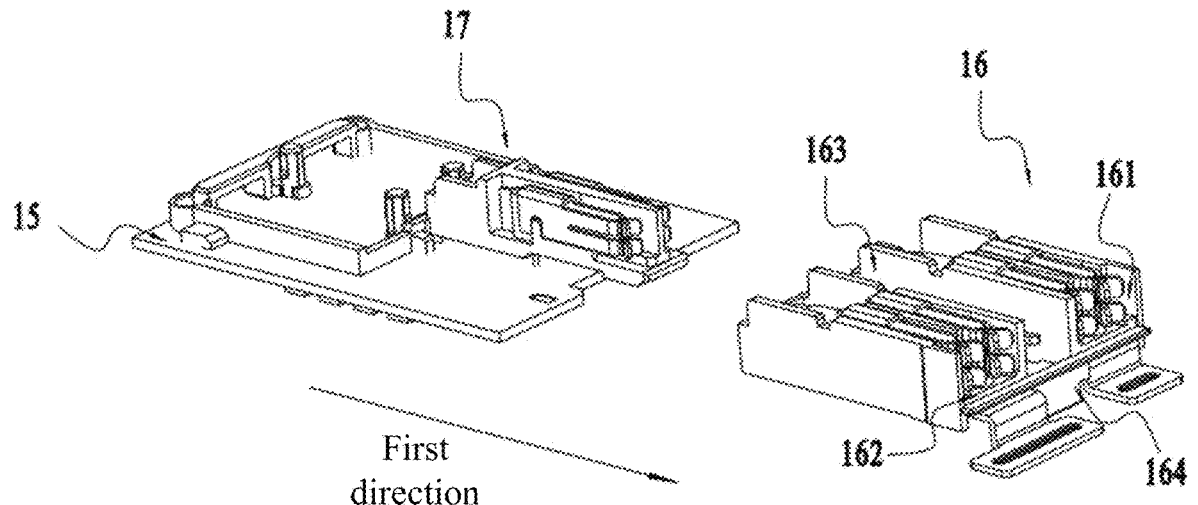
FIG. 4 is a schematic view of a second bracket coupled to a first bracket of a battery pack.

As shown in FIGS. 3 and 4, the battery pack further includes a cover plate 14, a circuit board 15, a first bracket 16, and a second bracket 17.

The cover plate 14 is connected to the lower housing 102 of the battery pack and the cover plate 14 and the lower housing 102 form an accommodation space for accommodating the cell assembly 11. In some examples, the cover plate 14 is detachably connected to the lower housing 102 of the battery pack through bolts so as to form the accommodation space for accommodating the cell assembly 11. Similarly, the cover plate 14 and the upper housing 101 of the battery pack also form an accommodation space for accommodating components such as the positive terminal 121 of the battery pack, the negative terminal 122 of the battery pack, and the communication terminal 123 of the battery pack. Specifically, the cover plate 14 has a flat plate-like structure.

The circuit board 15 is electrically connected to the cell assembly 11 and the battery pack interface 12. Specifically, the circuit board 15 is connected in series between the cell assembly 11 and the battery pack interface 12 and configured to collect an electrical signal related to the battery pack. In this example, the circuit board 15 is connected in series between the cell assembly 11 and the communication terminal 123 of the battery pack and configured to transmit information of the battery pack through the communication terminal 123 of the battery pack to the power tool attached to the battery pack. The information of the battery pack includes the discharge current of the battery pack, the temperature of the cell assembly 11 and/or the cell unit 111, the voltage of the cell unit 111, and a value of the internal resistance of the cell unit 111.

The first bracket 16 is disposed on an upper side of the lower housing 102 and configured to fix the positive terminal 121 of the battery pack and the negative terminal 122 of the battery pack. Specifically, the first bracket 16 is disposed in the accommodation space formed by the cover plate 14 and the upper housing 101 of the battery pack, that is, the first bracket 16 is disposed on an upper side of the cover plate 14. Therefore, the first bracket 16 is configured to fix the positive terminal 121 and the negative terminal 122 of the battery pack at preset positions on the upper side of the cover plate 14. The first bracket 16 includes a flat plate portion fixed to an upper surface of the cover plate 14, and the positive terminal 121 of the battery pack and the negative terminal 122 of the battery pack are fixed to the flat plate portion in an exposed state. Specifically, the first bracket 16 further includes a positive terminal portion 161 and a negative terminal portion 162, where the positive terminal portion 161 is configured to accommodate the positive terminal 121 of the battery pack, and the negative terminal portion 162 is configured to accommodate the negative terminal 122 of the battery pack. In some examples, the positive terminal portion 161 and the negative terminal portion 162 each are a structure with an opening at at least one end along the installation direction of the battery pack so that when the battery pack 100 is coupled to the power tool, the positive terminal 121 of the battery pack and the negative terminal 122 of the battery pack can accommodate the tool terminals, and thus the battery pack is electrically connected to the power tool, so as to output the electric power of the battery pack 100 to the power tool.

Figure 5:
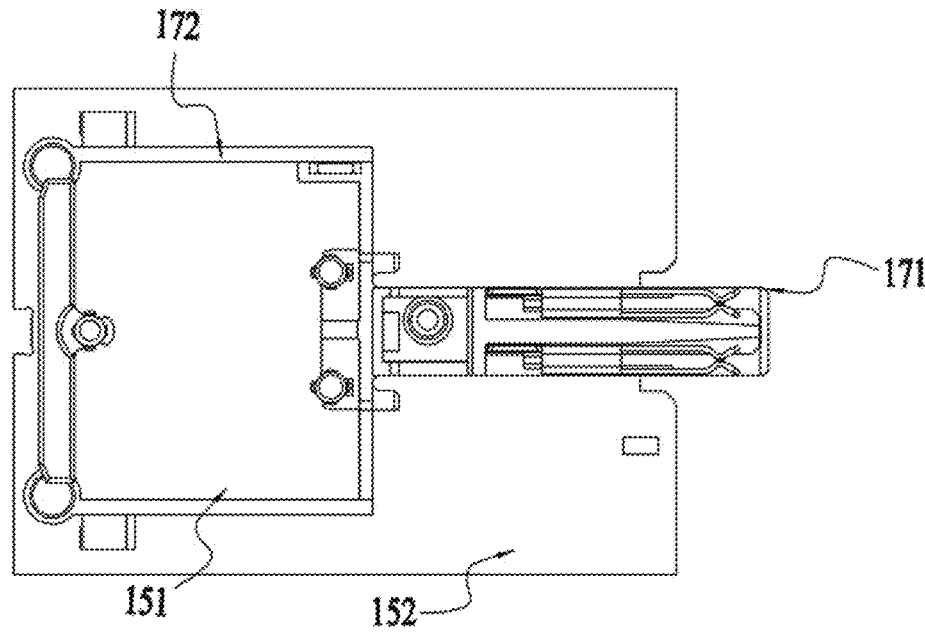
FIG. 5 is a structural view of the second bracket and a circuit board shown in FIG. 4 from another angle.

The second bracket 17 is disposed on an upper side of the circuit board 15 to fix the circuit board 15. Specifically, the second bracket 17 and the circuit board 15 are disposed on the upper side of the cover plate 14, that is, the second bracket 17 and the circuit board 15 are disposed in the accommodation space formed by the cover plate 14 and the upper housing of the battery pack. The second bracket 17 is further configured to fix the communication terminal 123 of the battery pack. Therefore, the second bracket 17 includes a communication terminal portion 171 configured to support the communication terminal 123 of the battery pack. Moreover, the second bracket 17 further includes a connection portion 172, where the connection portion 172 is a square frame detachably connected to the circuit board 15 so that the second bracket 17 is detachably connected to the circuit board 15. The connection portion 172 is formed with an open region so as to encapsulate the circuit board 15. In this manner, as shown in FIG. 5, the circuit board 15 may be divided into two regions through the square frame of the connection portion 172, where a region of the circuit board 15 on an inner side of the connection portion 172 is defined as a first region 151, and a region of the circuit board 15 on an outer side of the connection portion 172 is defined as a second region 152. Therefore, to improve the waterproof performance of the battery pack, as many electronic elements as possible are encapsulated in the first region 151, and the number of electronic elements accommodated in the first region 151 is greater than the number of electronic elements in the second region 152. The connection portion 172 is provided, which facilitates the subsequent encapsulation of the electronic elements on the inner side of the connection portion 172, that is, the electronic elements in the first region 151 of the circuit board 15 in a glue injection manner, so as to improve the waterproof performance of the circuit board 15 and improve the reliability of the battery pack.

When the circuit board 15 fails, to facilitate maintenance to prolong the service life of the battery pack and reduce the use cost of the battery pack, the circuit board 15 can be detached from the battery pack for maintenance. Therefore, the second bracket 17 is configured to be detachably connected to the first bracket 16 so that the circuit board 15 is detachably connected to the first bracket 16. When the circuit board 15 fails, the second bracket 17 along with the circuit board 15 is detached from the first bracket 16 so that the circuit board 15 is separated from the battery pack, which facilitates the maintenance of the circuit board 15. A detailed description is given below in conjunction with examples.

In some examples, the first bracket 16 further includes a guiding portion 163 configured to guide the second bracket 17 to be coupled to the first bracket 16 along a second direction. In some examples, the positive terminal portion 161 and the negative terminal portion 162 of the first bracket 16 are disposed on two sides of the guiding portion 163. Band plates extending along the second direction are formed on left and right sides of the guiding portion 163 and stand at right angles to the cover plate 14. The band plates on the left and right sides of the guiding portion 163 form a space so as to adapt to the communication terminal portion 171 of the second bracket 17. Specifically, the communication terminal portion 171 is slidably coupled to the first bracket 16 along the band plates on the left and right sides of the guiding portion 163, and the guiding portion 163 can accommodate the communication terminal portion 171. In some other examples, the positive terminal portion 161 and the negative terminal portion 162 of the first bracket 16 are disposed adjacent to each other, and the guiding portion 163 is disposed adjacent to the positive terminal portion 161 or the negative terminal portion 162. Accordingly, a position where the communication terminal portion 171 of the second bracket 17 is disposed is adapted to the guiding portion 163 so that when the second bracket 17 is coupled to the first bracket 16, the guiding portion 163 can fit with the communication terminal portion 171.

In some examples, the first bracket 16 further includes a base 164, where the base 164 is a component configured to fix the first bracket 16 to a predetermined position of the cover plate 14. The base 164 is provided so that an accommodation space for accommodating part of the circuit board 15 is formed between the first bracket 16 and the cover plate 14. In this manner, the overall structure of the first bracket 16, the second bracket 17, and the circuit board 15 is more compact, and a dimension of the battery pack is reduced. Moreover, the cover plate 14 is further provided with multiple limiting portions so as to provide convenience for guiding the second bracket 17 to be coupled to the first bracket 16 along the second direction. In this manner, the circuit board 15 is disposed more stably, and the anti-vibration performance of the battery pack is improved. Specifically, referring to FIG. 3, the cover plate 14 is further provided with a first limiting portion 141, a second limiting portion 142, and a third limiting portion 143. The first limiting portion 141 and the second limiting portion 142 are disposed on left and right sides of the circuit board 15 to assist the guiding portion 163 of the first bracket 16 in guiding the second bracket 17 to be coupled to the first bracket 16 along the second direction. At the same time, the first limiting portion 141 and the second limiting portion 142 assist the guiding portion 163 in guiding the circuit board 15 to be coupled to the accommodation space formed by the first bracket 16 and the cover plate 14 along the second direction so that after the second bracket 17 is coupled to the first bracket 16 and the circuit board 15 is coupled to the accommodation space between the first bracket 16 and the cover plate 14, the circuit board 15 is disposed more stably and will not move left and right with the vibration of the battery pack. In some examples, the third limiting portion 143 is further provided on the cover plate 14 and on a lower side of the circuit board 15 so that after the second bracket 17 is coupled to the first bracket 16 and the circuit board 15 is coupled to the accommodation space between the first bracket 16 and the cover plate 14, the circuit board 15 is disposed more stably and will not move up and down with the vibration of the battery pack.

Figure 6:
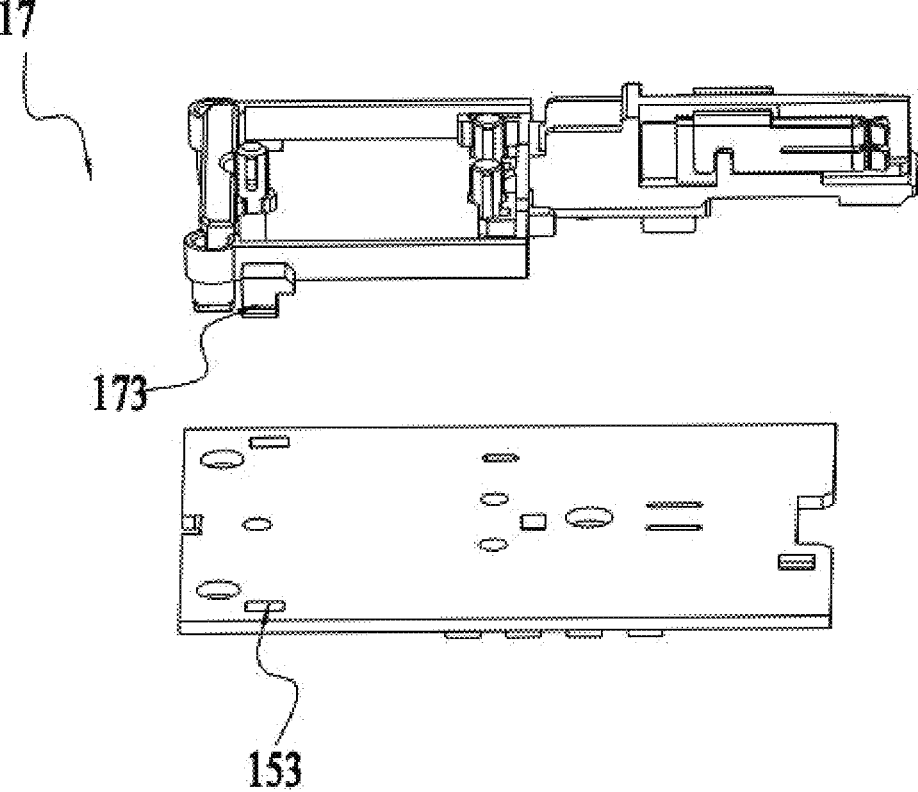
FIG. 6 is a schematic view of a second bracket and a circuit board as an example.

Referring to FIG. 6 which is a schematic view of the second bracket 17 and the circuit board 15, the second bracket 17 further includes multiple snap fits 173. Specifically, multiple protrusions extend downward from the second bracket 17 to form the snap fits 173, and multiple slots 153 corresponding to the snap fits 173 are provided on the circuit board 15. Therefore, the snap fits 173 mate with the slots 153 so that the second bracket 17 is detachably connected to the circuit board 15. In some examples, a height of the snap fit 173 is the same as a thickness of the circuit board 15. In some other examples, the height of the snap fit 173 is greater than the thickness of the circuit board 15. After the second bracket 17 is connected to the circuit board 15, the snap fit 173 protrudes from a lower surface of the circuit board 15 and abuts against the cover plate 14. In this manner, the snap fit 173 is equivalent to the third limiting portion 143 so that after the second bracket 17 is coupled to the first bracket 16 and the circuit board 15 is coupled to the accommodation space between the first bracket 16 and the cover plate 14, the circuit board 15 is disposed more stably and will not move up and down with the vibration of the battery pack.

The battery pack further includes a detection sensor configured to detect operating parameters of the cell assembly 11 or the cell unit 111 and transmit the operating parameters to the circuit board 15. One or more detection sensors may be provided. In some examples, the detection sensor may be a temperature sensor. The temperature sensor is disposed on a surface of the cell assembly 11 or a surface of the cell unit 111 and connected to the circuit board 15 to transmit temperature information of the cell assembly 11 to the circuit board 15. In some examples, the detection sensor may be a voltage sensor configured to detect the voltage of the cell unit 111 and connected to the circuit board 15 to transmit temperature information of the cell assembly 11 to the circuit board 15. In some examples, the battery pack includes the temperature sensor, the voltage sensor, and a detection circuit board 18, and the temperature sensor and the voltage sensor are integrated on the detection circuit board 18. To facilitate detection, the detection circuit board 18 is disposed on a side of the positive terminal of the cell assembly 11 and the negative terminal of the cell assembly 11. At the same time, to save space and improve the reliability of the battery pack, the detection circuit board 18 may also be a flexible printed board (FPC) which may be bent. It is to be understood that the battery pack may further include other types of sensors so that the circuit board 15 can collect the information of the battery pack through various sensors and transmit the information of the battery pack through the communication terminal 123 of the battery pack to the power tool or the charger attached to the battery pack.

Figure 7:
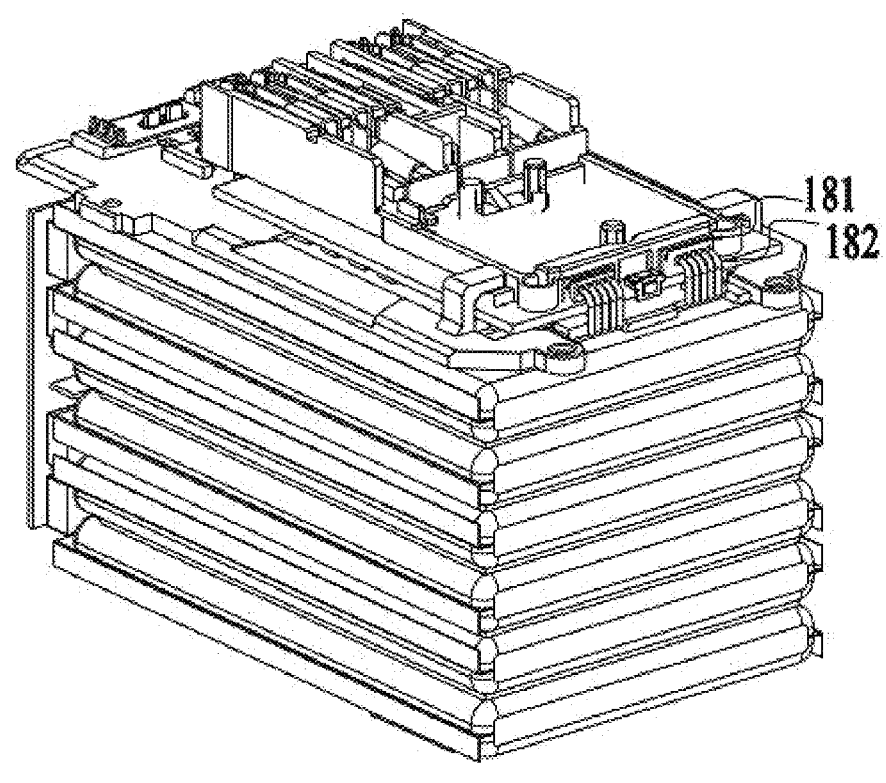
FIG. 7 is a structural view of the battery pack shown in FIG. 1 with a housing removed from another angle.

As shown in FIG. 7, the battery pack 100 further includes a detection line output socket 181 connected to a sensor connection line 182, where the sensor connection line 182 is electrically connected to the circuit board 15 through the detection line output socket 181. The sensor connection line 182 is connected to the detection sensor on the detection circuit board 18 so as to output a sensor signal to the circuit board 15. To facilitate the detachable connection of the circuit board 15 and the battery pack, the detection line output socket 181 is detachably connected to the circuit board 15 so that the sensor connection line 182 is detachably connected to the circuit board 15. Therefore, in some examples, the detection line output socket 181 is detachably connected to the second bracket 17. Specifically, the sensor connection line 182 is connected to the detection line output socket 181 by a wire harness, and the second bracket 17 is provided with a socket adapter structure so that the detection line output socket 181 is detachably connected to the second bracket 17. In some other examples, multiple detection line output sockets 181 may be provided, and the second bracket 17 is provided with socket adapter structures whose number matches the number of the detection line output sockets 181. In this example, the battery pack includes a first detection line output socket and a second detection line output socket. The first detection line output socket and the second detection line output socket are disposed on two sides of a power display switch, and six sensor connection lines 182 are plugged into each of the first detection line output socket and the second detection line output socket. It is to be understood that one detection line output socket 181 may be provided, and different numbers of sensor connection lines 182 may be plugged into the detection line output socket 181. The number of sensor connection lines 182 may be determined according to the number of detection sensors, which is not limited herein.

As shown in FIG. 7, multiple sensor connection lines 182 are plugged into the detection line output socket 181. Since the sensor connection lines are arranged relatively close, two adjacent sensor connection lines are easy to touch when being plugged or unplugged, causing a short circuit, thereby damaging the detection circuit board and even the cell. Therefore, a resistor is connected in series on each sensor connection line to limit a current when two adjacent sensor connection lines are short-circuited, thereby protecting the detection circuit board and the cell.

Figure 8:
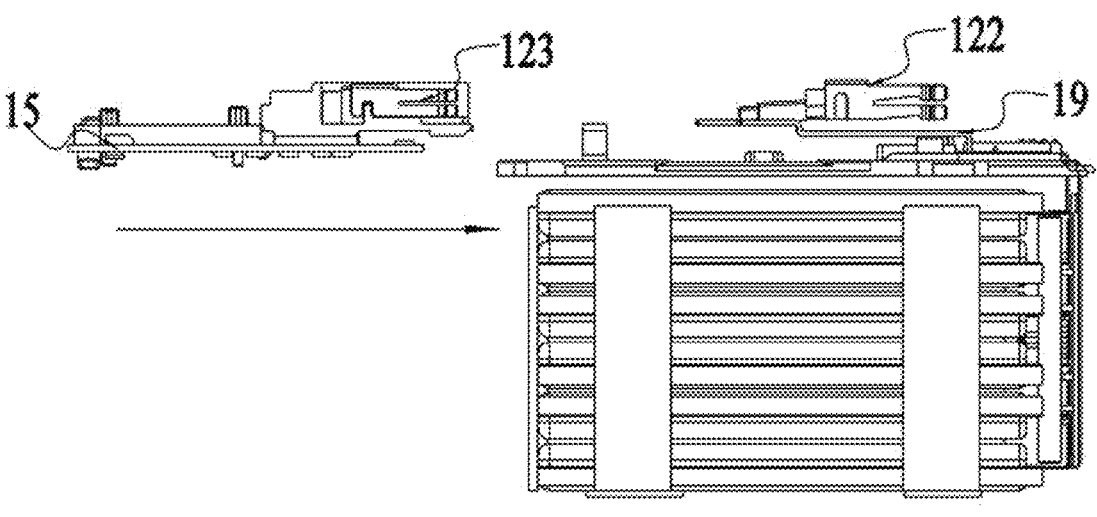
FIG. 8 is a schematic view illustrating installation of a second bracket of the battery pack shown in FIG. 3 with a first bracket removed.
Figure 9:
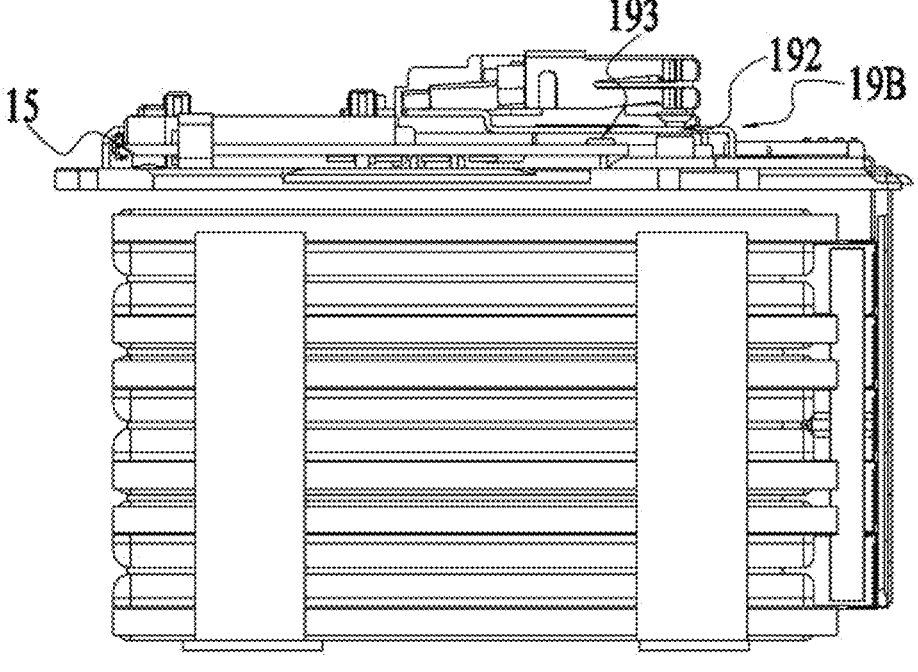
FIG. 9 is a structural view of the battery pack shown in FIG. 3 with a first bracket removed.

Referring to FIGS. 3, 8, and 9, the battery pack further includes a connection piece 19. Specifically, the battery pack 100 includes a positive electrode connection piece 19A and a negative electrode connection piece 19B. The positive electrode connection piece 19A is connected in series between the positive terminal 121 of the battery pack and the positive terminal 112 of the cell assembly, and the negative electrode connection piece 19B is connected in series between the negative terminal 122 of the battery pack and the negative terminal 113 of the cell assembly. In an example, the negative electrode connection piece 19B is disposed on a lower side of the negative terminal 122 of the battery pack, and part of the negative electrode connection piece 19B is disposed between the circuit board 15 and the negative terminal 122 of the battery pack. Specifically, the negative electrode connection piece 19B is disposed in an accommodation space formed between the negative terminal 122 of the battery pack and the cover plate 14. Similarly, the positive electrode connection piece 19A is disposed in an accommodation space formed between the positive terminal 121 of the battery pack and the cover plate 14.

The battery pack 100 further includes a current sensor 193 disposed at a position of the circuit board 15 where the current sensor 193 is capable of sensing a current flowing through the positive electrode connection piece 19A or the negative electrode connection piece 19B so as to detect an input current or an output current of the battery pack. Generally, the current sensor 193 is disposed at a position where the current sensor 193 is capable of sensing a magnetic field of the positive electrode connection piece 19A or the negative electrode connection piece 19B and on a side of the circuit board 15 facing towards the positive electrode connection piece 19A or the negative electrode connection piece 19B. Specifically, the current sensor 193 is disposed on a lower side of the positive electrode connection piece 19A or the negative electrode connection piece 19B, and the current sensor 193 is spaced apart from the positive electrode connection piece 19A or the negative electrode connection piece 19B.

Figure 10:
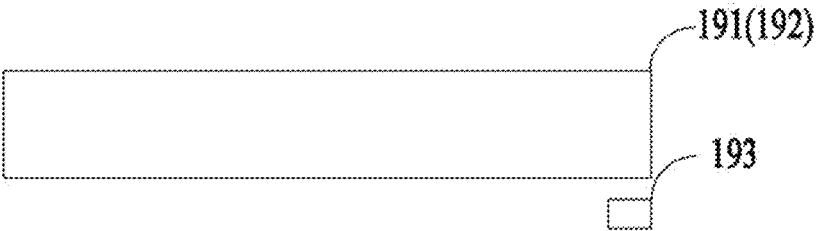
FIG. 10 is a top view of a positional relationship between a current sensor and a positive electrode connection piece or a negative electrode connection piece as an example.

In some examples, referring to FIG. 10 which is a top view of a positional relationship between the current sensor 193 and the positive electrode connection piece 19A or the negative electrode connection piece 19B, the current sensor 193 is disposed close to an edge of the positive electrode connection piece 19A or the negative electrode connection piece 19B so that the current sensor 193 can sense the current flowing through the positive electrode connection piece 19A or the negative electrode connection piece 19B. A size and a shape of the circuit board where the current sensor 193 is located may be set according to a position of the current sensor 193. Moreover, the battery pack may correspondingly include multiple circuit boards so that the current sensor 193 is disposed close to the edge of the positive electrode connection piece 19A or the negative electrode connection piece 19B.

Figure 11:
FIG. 11 is a side view of a positional relationship between a current sensor and a positive electrode connection piece or a negative electrode connection piece as an example.
Figure 11:
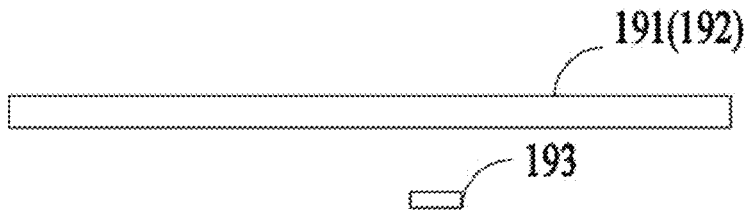

In some other examples, referring to FIG. 11 which is a side view of the positional relationship between the current sensor 193 and the positive electrode connection piece 19A or the negative electrode connection piece 19B, the current sensor 193 is disposed close to an outer surface of the positive electrode connection piece 19A or the negative electrode connection piece 19B. Optionally, the current sensor 193 is close to a lower surface of the positive electrode connection piece 19A or the negative electrode connection piece 19B so that the current sensor 193 can sense the current flowing through the positive electrode connection piece 19A or the negative electrode connection piece 19B. Referring to FIG. 12, in this example, it is defined that the circuit board 15 is formed with a third region 154, and a projection plane of the third region 154 in the up-and-down direction coincides with a projection plane of the positive electrode connection piece 19A and/or the negative electrode connection piece 19B in the up-and-down direction. The current sensor 193 is disposed in the second region 152 of the circuit board 15. Optionally, the current sensor 193 is disposed in the third region 154 of the circuit board 15. Optionally, the current sensor 193 is disposed at a position close to a center of the third region 154 in the third region 154 of the circuit board 15 so that the current sensor 193 receives more magnetic fields around the positive electrode connection piece 19A or the negative electrode connection piece 19B so as to more accurately sense the current flowing through the positive electrode connection piece 19A or the negative electrode connection piece 19B. In this example, the positive electrode connection piece 19A includes a positive current detection portion 191, and the negative electrode connection piece 19B includes a negative current detection portion 192, where the positive current detection portion 191 and the negative current detection portion 192 are arranged in parallel with the circuit board 15, and the current sensor 193 is disposed on a lower side of the positive current detection portion 191 or the negative current detection portion 192.

The current sensor 193 is a chip-type current sensor and can perform current sampling in a non-contact manner so that the discharge current or the charge current of the battery pack 100 is directly outputted to the power tool through the positive terminal 121 of the battery pack and the negative terminal 122 of the battery pack without passing through the circuit board 15. In this manner, a large amount of heat generated by the positive terminal 121 of the battery pack and the negative terminal 122 of the battery pack can be prevented from being conducted to the circuit board 15, and the heat generation of the circuit board 15 is also reduced, thereby reducing the heat generation of the battery pack 100, improving the safety of the circuit board 15, and improving the reliability of the battery pack 100. The positive electrode connection piece 19A and the negative electrode connection piece 19B are each made of a metal, and the current sensor 193 may be a Hall sensor.

The battery pack 100 further includes a cell support 117 configured to support the cell assembly 11, and the cell support 117 is made of a second material that is different from the first material. In some examples, the second material is a thermosetting material, and the first material of the housing 11 is a thermoplastic material. Optionally, a hardness of the second material is different from a hardness of the first material. In some examples, the hardness of the second material is less than the hardness of the first material so that the housing with greater hardness can better protect the cell assembly 11. The cell support 117 is at least disposed at two ends of the cell assembly 11, and at least part of the cell support 117 encapsulates the positive electrode of the cell unit and the negative electrode of the cell unit. Therefore, the second material may be an insulating material which can insulate the positive electrode of the cell unit and the negative electrode of the cell unit encapsulated by the cell support 117 so as to prevent the leakage of electricity.

In some examples, the cell support 117 includes a first support and a second support. The first support is disposed on a front end surface of the cell assembly 11, where the front end surface is a surface of the cell assembly 11 where the positive electrode of the cell unit 111 and the negative electrode of the cell unit are provided. The second support is disposed on a rear end surface of the cell assembly 11, where the rear end surface and the front end surface are opposite to each other. Optionally, the cell support 117 covers and fixes the positive electrode of the cell unit, the negative electrode of the cell unit, the positive lead-out piece 114, and the negative lead-out piece 115. In this example, referring to FIG. 13, the cell support 117 extends from the front end surface and the rear end surface of the cell assembly 11 to a left side surface, a right side surface, and a lower bottom surface of the cell assembly 11 and is disposed around the front end surface, the rear end surface, the left side surface, the right side surface, and the lower bottom surface of the cell assembly 11 to form an accommodation space with an upper opening and for accommodating the cell assembly 11. Specifically, the cell assembly 11 is placed in a mold, the support is formed around the front end surface, the rear end surface, the left side surface, the right side surface, and the lower bottom surface of the cell assembly 11 in a glue injection manner, and then the cell assembly 11 and the shaped cell support 117 are taken out as a whole.

In this manner, the cell support 117 is configured to support the cell assembly 11, avoiding a possible relative displacement between cell units 111 due to a bump or a vibration, thereby preventing the cells from being squeezed or kinked. Therefore, the cell support 117 can improve the anti-fall and shock-absorbing performance of the battery pack, thereby improving the reliability of the battery pack.

In some examples, a buffer layer is provided between cell units 111 and made of the second material. The buffer layer is provided between adjacent cell units 111. The buffer layer is provided between cell units 111, which is conducive to improving the anti-fall and shock-absorbing performance of the battery pack, thereby improving the reliability of the battery pack.

The battery pack 100 in the present application is applicable to a power tool 200 and detachably installed to the power tool 200. As shown in FIGS. 14 and 15, the power tool 200 is an impact wrench. Although this example relates to the impact wrench, it is to be understood that the present application is not limited to the examples described herein and is applicable to other types of power tools. The power tool may be, for example, a garden tool such as a string trimmer, a pruner, a blower, or a chainsaw. The power tool may also be a torque output tool such as an electric drill or an electric hammer. The power tool may also be a sawing tool such as an electric circular saw, a jig saw, or a reciprocating saw. The power tool may also be a grinding tool such as an angle grinder or a sander.

The power tool 200 includes a tool body 21 and a tool interface 22 and a tool mating portion 23 that are disposed on the tool body 21. The tool body 21 includes a motor 211, an output shaft 212, and an impact mechanism 213. The output shaft 212 is driven by the motor 211. The impact mechanism 213 connects the motor 211 to the output shaft 212. The impact mechanism 213 is driven by the motor 211 and applies an impact to the output shaft 212. The power tool 200 further includes a handle 214 that can be held by a user to operate the power tool. The handle 214 is further provided with a trigger switch 215. The trigger switch 215 is configured to be driven by the user to start or stop the operation of the motor 211. The tool interface 22 is configured to adapt to the battery pack interface 12 so that the battery pack 100 is connected and supplies power to the power tool 200. Moreover, the tool mating portion 23 is detachably connected to the battery pack coupling portion 13. In some examples, the tool mating portion 23 is disposed at a lower end of the handle 214 of the power tool and configured to be detachably connected to the battery pack 100. Generally, the battery pack coupling portion 13 is provided with a pair of sliding portions each with an inverted L-shaped cross section. Correspondingly, the sliding portions can slide along the tool mating portion 23 at a bottom of the handle so that the sliding portions can be installed to the tool body 21 through the tool mating portion 23, where the tool mating portion 23 may be provided as a pair of guide rails. Specifically, when the user slides the battery pack toward the front of the tool body 21, the battery pack 100 may be connected to the tool body 21.

Currently, battery packs for supplying power to power tools mostly use cylindrical lithium cells. Multiple cylindrical lithium cells connected in series and in parallel ensure sufficient electric power output so that the endurance of the power tools is improved. For example, an output voltage of a cylindrical lithium cell is about 3.6 V, and then the maximum number of lithium cells connected in series in a battery pack with an output voltage of 18 V is 5.

However, with the development of battery technology, a battery pack with a higher output voltage and a relatively low impedance in a chemical composition and configuration form may have the problem of compatibility with a power tool in the related art. When the internal resistance of the battery pack is reduced, the battery pack can supply a substantially higher current to the power tool. When the current increases beyond the expectations or design limits of the motor and electronic elements of the power tool, the power tool may burn out or enter over-current protection and become unusable. To solve the defects in the related art, the present application provides a power tool system and a battery pack thereof which can improve the compatibility of the battery pack and expand the usage scenarios of the battery pack. A detailed description is given below.

FIG. 16 shows a power tool system 300, where the power tool system 300 includes a power tool 310 and a first rechargeable battery pack 320 and a second rechargeable battery pack 330 that can adapt to the power tool to supply power to the power tool. In FIG. 16, the power tool 310 is an impact wrench. Although this example relates to the impact wrench, it is to be understood that the present application is not limited to the examples described herein and is applicable to other types of power tools, which include, but are not limited to, an electric drill, a sander, an angle grinder, an electric wrench, a motorized saw, and the like.

As shown in FIGS. 16 to 18, each battery pack includes a housing, a cell assembly, and a battery pack interface. With the second rechargeable battery pack 330 as an example, a cell assembly 332 is disposed in an accommodation cavity formed by a housing 331, and a second battery pack interface 333 and a battery pack coupling portion 334 are formed on an upper surface of the housing 331. The battery pack interface 333 includes a power supply positive interface, a power supply negative interface, and a power supply communication interface. The battery pack supplies power to the power tool through the power supply positive interface and the power supply negative interface and communicates with the power tool through the power supply communication interface.

In some examples, an energy density (energy/mass of the battery pack) of the cell assembly 332 of the second rechargeable battery pack 330 shown in FIG. 18 is in a value range of greater than 150 Wh/kg. Optionally, the energy density (energy/mass of the battery pack) of the cell assembly 332 is in a value range of greater than 200 Wh/kg. Optionally, the energy density (energy/mass of the battery pack) of the cell assembly 332 is in a value range from 150 Wh/kg to 200 Wh/kg. Optionally, the energy density (energy/mass of the battery pack) of the cell assembly 332 is in a value range from 200 Wh/kg to 250 Wh/kg. Optionally, the energy density (energy/mass of the battery pack) of the cell assembly 332 is in a value range from 250 Wh/kg to 300 Wh/kg. Optionally, the energy density (energy/mass of the battery pack) of the cell assembly 332 is in a value range from 300 Wh/kg to 450 Wh/kg.

The battery pack composed of the flat plate-like cell assembly 332 may be referred to as "the second rechargeable battery pack 330" hereinafter, and the battery pack composed of a cylindrical cell assembly 332' for the power tool is referred to as "the first rechargeable battery pack 320" so as to distinguish the two battery packs. The first rechargeable battery pack 320 is shown in FIG. 17.

The first rechargeable battery pack 320 has a first battery pack interface 323 adaptable to a tool interface 311 of the power tool 310, and the second rechargeable battery pack 330 has the second battery pack interface 333 adaptable to the tool interface 311 of the power tool 310. A shape of the first battery pack interface 323 is basically the same as a shape of the second battery pack interface 333. Specifically, the first battery pack interface 323 and the second battery pack interface 333 are disposed on an upper surface of the first rechargeable battery pack 320 and an upper surface of the second rechargeable battery pack 330, respectively, and each of the first battery pack interface 323 and the second battery pack interface 333 includes at least the power supply positive interface, the power supply negative interface, and the power supply communication interface.

Compared with the first rechargeable battery pack 320, the second rechargeable battery pack 330 has a different electrical characteristic. In some examples, the first rechargeable battery pack 320 has a first electrical characteristic adapted to the power tool 310, and the second rechargeable battery pack 330 has a second electrical characteristic. The second electrical characteristic includes at least one of the following electrical parameters: an internal resistance of the second rechargeable battery pack 330 or a discharge current or full battery endurance of the second rechargeable battery pack 330. Specifically, compared with the first rechargeable battery pack 320, the second rechargeable battery pack 330 can output a similar or higher output voltage and has a relatively low internal resistance. In this manner, no matter when being charged or discharged, the second rechargeable battery pack 330 has a relatively low voltage drop and heat accumulation and thus can withstand relatively high charge and discharge currents. Therefore, the second rechargeable battery pack 330 can provide a relatively high current and power to the power tool 310.

In some examples, the second rechargeable battery pack 330 shown in FIG. 18 has a discharge capacity of at least 100 A. In the case where the second rechargeable battery pack 330 is discharged at a rate of 10 C, a temperature rise is less than 45° C. Moreover, an internal resistance of the cell assembly 332 of the second rechargeable battery pack 330 is less than or equal to 10 mΩ. Optionally, the internal resistance of the cell assembly 332 of the second rechargeable battery pack 330 is less than or equal to 6 mΩ. Optionally, the internal resistance of the cell assembly 332 of the second rechargeable battery pack 330 is less than or equal to 3 mΩ.

In some examples, the second rechargeable battery pack 330 shown in FIG. 18 has a discharge current of greater than or equal to 80 A. Optionally, the second rechargeable battery pack 330 has a discharge current of greater than or equal to 100 A. In this manner, the power tool 310 adaptable to the first rechargeable battery pack 320 is a first power tool 3101, and the power tool 310 that can be powered by the second rechargeable battery pack 330 is referred to as a second power tool 3102. Therefore, the first power tool 3101 is designed to operate with the first rechargeable battery pack 320 that outputs a low current and a low power, and the first power tool 3101 has first output performance. On the contrary, compared with the first power tool 3101 powered by the first rechargeable battery pack 320, when operating with the second rechargeable battery pack 330 attached to the second power tool 3102, the second power tool 3102 can operate at a larger current and power, and the second power tool 3102 has second output performance different from the first output performance.

However, when the first power tool 3101 is powered by the second rechargeable battery pack 330, the first power tool 3101 may be damaged due to an excessive output capacity of the second rechargeable battery pack 330. At a given current, the second rechargeable battery pack 330 has a lower voltage drop in the battery pack than the first rechargeable battery pack 320. For example, when the first rechargeable battery pack 320 with a rated voltage of 18 V has an output current of 10 C, the first rechargeable battery pack 320 may output an output voltage of 15 V when charged at 50%, while the second rechargeable battery pack 330 outputs an output voltage of at least 17.5 V at the same discharge current of 10 C when charged at 50%. For example, when the first rechargeable battery pack 320 and the second rechargeable battery pack 330 both have a capacity of 4 Ah and an output current of 40 A, an input power of the first power tool 3101 powered by the first rechargeable battery pack 320 is about 600 W, and an input power of the second power tool 3102 powered by the second rechargeable battery pack 330 is about 700 W. The high output power limits the usage scenarios of the second rechargeable battery pack 330. To solve this problem, the following examples can expand the usage scenarios of the second rechargeable battery pack 330 so that the second rechargeable battery pack 330 can adapt to both the first power tool 3101 and the second power tool 3102.

FIG. 19 is a block diagram showing modules of a first power tool system 3001 and modules of a second power tool system 3002. FIG. 19 shows the following principle: the first power tool 3101 can be powered by the first rechargeable battery pack 320 and can also be powered by the second rechargeable battery pack 330. Similarly, the second power tool 3102 can be powered by the second rechargeable battery pack 330 and can also be powered by the first rechargeable battery pack 320. In other words, the second rechargeable battery pack 330 can adapt to both the second power tool 3102 and the first power tool 3101 so that the compatibility of the battery pack is improved, thereby expanding the usage scenarios of the battery pack.

FIG. 20 is a circuit block diagram of a power tool system as one of examples. The power tool system includes a power tool 3101 and a rechargeable battery pack 60 (a first rechargeable battery pack 320 or a second rechargeable battery pack 330).

The rechargeable battery pack 60 includes at least multiple cells connected in series. FIG. 20 shows a cell assembly 61 composed of four cells connected in series. The rechargeable battery pack 60 may have more than four cells. The rechargeable battery pack 60 further includes a power supply positive terminal 62, a power supply negative terminal 63, a power supply communication terminal 64, a power supply identification module 65, and a temperature sensor 66.

The power supply positive terminal 62 and the power supply negative terminal 63 are configured for output of a discharge current or input of a charge current. The power supply communication terminal 64 is configured for communication with a power tool 310. The power supply positive terminal 62 is disposed in a power supply positive interface, the power supply negative terminal 63 is disposed in a power supply negative interface, and the power supply communication terminal 64 is disposed in a power supply communication interface.

The temperature sensor 66 is configured to detect a temperature of the cell assembly 61. In some examples, the temperature sensor 66 is connected to the power supply communication terminal 64. Specifically, the temperature sensor 66 is disposed on a surface of a cell and configured to detect a temperature of the surface of the cell. When the temperature of the surface of the cell is greater than or equal to a threshold, the temperature sensor 66 outputs an over-temperature signal to the power tool 3101 so that the power tool 3101 stops receiving electric power outputted by the rechargeable battery pack 60, thereby preventing the rechargeable battery pack 60 from explosion due to over-heating. The temperature sensor 66 may be a thermistor such as a thermistor of a negative temperature coefficient (NTC) or a thermistor of a positive temperature coefficient (PTC).

The power supply identification module 65 stores an identifier (ID) of the rechargeable battery pack and is configured to identify the first rechargeable battery pack 320 or the second rechargeable battery pack 330 when inserted into a charger or a power tool. The ID of the rechargeable battery pack includes, for example, a model, a version, a cell configuration, and a battery type such as a battery with cylindrical cells or a battery with flat cells. The ID of the rechargeable battery pack may be one or more communication codes and may also be an ID resistor, a light-emitting diode (LED) display configured to display identification data of the rechargeable battery pack, serial data sent when the rechargeable battery pack is connected to and sensed by the power tool or the charger, fields in a frame of data sent to the power tool/charger through the power supply communication interface, or the like.

Moreover, the power tool 3101 includes at least a motor 3111, a switch circuit 3121, a tool control module 3131, a tool identification module 3141, a tool interface positive terminal 3151, a tool interface negative terminal 3161, and a tool interface communication terminal 3171. The tool interface positive terminal 3151 and the tool interface negative terminal 3161 are configured to access the discharge current outputted by the rechargeable battery pack 60. The tool interface communication terminal 3171 enables the power tool 3101 to communicate with the rechargeable battery pack 60. Specifically, the tool interface positive terminal 3151 is disposed in a tool positive interface and can be detachably connected to the power supply positive terminal 62 of the rechargeable battery pack 60; the tool interface negative terminal 3161 is disposed in a tool negative interface and can be detachably connected to the power supply negative terminal 63 of the rechargeable battery pack 60; and the tool interface communication terminal 3171 is disposed in a tool communication interface and can be detachably connected to the power supply communication terminal 64 of the rechargeable battery pack 60.

The switch circuit 3121 is configured to drive the motor 3111 and electrically connected to the tool control module 3131. The switch circuit 3121 receives electric power from the rechargeable battery pack 60 and is driven by a switch signal outputted by the tool control module 3131 to distribute the voltage of the rechargeable battery pack 60 to each phase winding on a stator of the motor 3111 with a certain logical relationship so that the motor 3111 starts and rotates continuously. Specifically, the switch circuit 3121 includes multiple electronic switches. In some examples, the electronic switch includes a field-effect transistor (FET). In some other examples, the electronic switch includes an insulated-gate bipolar transistor (IGBT).

The tool identification module 3141 is configured to identify one of the first rechargeable battery pack 320 or the second rechargeable battery pack 330 connected through the tool interface 311. The tool identification module 3141 is connected to the tool interface communication terminal 3171. Through the tool interface communication terminal 3171, the tool identification module 3141 can communicate with the battery pack attached to the power tool and sense information of the battery pack. The information of the battery pack includes the model, the version, the cell configuration, and the battery type such as the battery with cylindrical cells or the battery with flat cells. Therefore, the tool identification module 3141 can determine, according to the information of the battery pack, whether the first rechargeable battery pack 320 or the second rechargeable battery pack 330 is connected through the tool interface 311 and transmit an identification signal to the tool control module 3131. In some examples, the tool identification module 3141 can also transmit a shutdown signal to the tool control module 3131 after receiving the over-temperature signal of the rechargeable battery pack 60 so as to control the first power tool 3101 to shut down, thereby protecting the safety of the battery pack and the power tool.

In some examples, the tool identification module 3141 may include a sensor. Specifically, the sensor may be a magnetic sensor or an inductive pickup sensor to sense the information of the battery pack attached to the power tool. Whether the first rechargeable battery pack 320 or the second rechargeable battery pack 330 is attached to the power tool is identified through radio frequency communication and light sensing.

The tool control module 3131 is connected to at least the tool interface 311 and configured to control output performance of the first power tool 3101 according to the rechargeable battery pack 60 connected through the tool interface 311. Specifically, the tool control module 3131 is configured to control, according to the identification signal, the voltage or current applied to two ends of the motor so that the motor can operate normally. For example, when the first power tool 3101 is powered by the first rechargeable battery pack 320, the tool identification module 3141 identifies that the first rechargeable battery pack 320 is connected through the tool interface 311 and transmits a first identification signal to the tool control module 3131, and then the tool control module 3131 may completely load the output voltage and current of the first rechargeable battery pack 320 to the motor 3111; the tool identification module 3141 identifies that the second rechargeable battery pack 330 is connected through the tool interface 311 and transmits the identification signal to the tool control module 3131, and then the tool control module 3131 limits the voltage and current loaded to the two ends of the motor 3111 through the switch circuit 3121 by transmitting a pulse-width modulation (PWM) signal to the switch circuit 3121. The PWM signal may quickly turn on and off the multiple electronic switches in the switch circuit 3121 and distribute an average voltage across the motor, where the average voltage is lower than an input voltage of the rechargeable battery pack 60. It is to be understood that the tool identification module 3141 and the tool control module 3131 may be integrated or may be provided separately.

FIG. 21 is a circuit block diagram of a power tool system as another example. A difference from the power tool system shown in FIG. 20 is that the second power tool 3102 shown in FIG. 21 further includes a power limiting module 3152.

The power limiting module 3152 is configured to limit an input current from the rechargeable battery pack 60 to limit power input. The power limiting module 3152 may increase a resistance value according to an identification signal received from a tool identification module 3142. The tool identification module 3142 may sense the type of the rechargeable battery pack 60 (the first rechargeable battery pack 320 or the second rechargeable battery pack 330) attached to the second power tool 3102 and transmit the identification signal to a tool control module 3132 so as to indicate whether the first rechargeable battery pack 320 or the second rechargeable battery pack 330 is attached, and the tool control module 3132 transmits a control signal to the power limiting module 3152 according to the identification signal. Therefore, the power limiting module 3152 is configured to receive the control signal from the tool control module 3132 so as to increase impedance to limit a maximum input current from the rechargeable battery pack 60 or to maintain the maximum input current from the rechargeable battery pack 60.

In some examples, the power limiting module 3152 is connected in series between a tool interface positive terminal 3162 of the second power tool 3102 and the motor. In some other examples, the power limiting module 3152 is connected in series between a tool interface negative terminal 3182 of the second power tool 3102 and the motor. Specifically, the power limiting module 3152 may be a passive resistor, and the power limiter 3152 may also be an active resistor whose resistance changes with a load, for example, a semiconductor device or circuit with a current limiting function, such as the FET.

When the first rechargeable battery pack 320 supplies power to the second power tool 3102, the tool identification module 3142 of the second power tool 3102 transmits the identification signal to the tool control module 3132 so as to indicate that the first rechargeable battery pack 320 is attached to the second power tool 3102, and then the tool control module 3132 transmits the control signal to the power limiting module 3152 according to the identification signal so that an output current of the power limiting module 3152 remains a discharge current from the first rechargeable battery pack 320. When the second rechargeable battery pack 330 supplies power to the second power tool 3102, the tool identification module 3142 identifies, through a tool interface communication terminal 3172, that the second rechargeable battery pack 330 is connected and transmits the identification signal to the tool control module 3132 so as to indicate that the second rechargeable battery pack 330 is attached to the second power tool 3102, and then the tool control module 3132 transmits the control signal to the power limiting module 3152 according to the identification signal so that the output current of the power limiting module 3152 remains the maximum input current from the second rechargeable battery pack 330, and thus the second power tool 3102 operates at a larger current and power.

FIG. 22 is a circuit block diagram of a power tool system as another example. A difference from the power tool system shown in FIG. 20 is that a rechargeable battery pack 70 further includes a power limiting module 77.

In this example, the power limiting module 77 is disposed in the rechargeable battery pack 70 and connected to a power supply communication terminal 74. The power limiting module 77 is configured to limit an output current of the rechargeable battery pack 70 to limit power output. The power limiting module 77 may increase a resistance value according to the control signal received from the tool control module 3131. The tool identification module 3141 may sense the type of the rechargeable battery pack 70 (the first rechargeable battery pack 320 or the second rechargeable battery pack 330) attached to the first power tool 3101 and transmit the identification signal to the tool control module

3131 so as to indicate whether the first rechargeable battery pack 320 or the second rechargeable battery pack 330 is attached, and the tool control module 3131 transmits the control signal to the power limiting module 77 according to the identification signal. Therefore, the power limiting module 77 is configured to receive the identification signal from the tool control module 3131 so as to increase impedance to limit a maximum output current from the rechargeable battery pack 70 or to maintain the maximum input current of the rechargeable battery pack 70. Specifically, the tool control module 3131 transmits the control signal to the power limiting module 77 through the tool interface communication terminal 3171 and the power supply communication terminal 74.

The power limiting module 77 is disposed on a discharge path of the rechargeable battery pack 70. In some examples, the power limiting module 77 is disposed between a negative electrode of the cell assembly and a power supply negative terminal 73, and the power limiting module 77 may also be disposed between a positive electrode of the cell assembly and a power supply positive terminal 72. Specifically, the power limiting module 77 may be a passive resistor that can effectively increase the internal resistance of the battery pack. The power limiting module 77 may also be an active resistor so that an internal resistance of the rechargeable battery pack 70 may change with the load. For example, the power limiting module 77 may be a semiconductor device or circuit with a current limiting function, such as the FET.

In some examples, when the power tool 310 is powered by the first rechargeable battery pack 320, that is, when the first rechargeable battery pack 320 is connected through the tool interface 311, the tool identification module of the power tool 310 transmits the identification signal to the tool control module so as to indicate that the first rechargeable battery pack 320 is attached to the power tool 310, and then the tool control module transmits the control signal to the power limiting module in the first rechargeable battery pack 320 so that the power limiting module keeps the first rechargeable battery pack 320 to discharge at a maximum discharge current, that is, a first discharge current. When the second rechargeable battery pack 330 is used as a power supply of the power tool, if the power tool is the first power tool 3101, the tool identification module 3141 identifies, through a tool interface communication terminal 3171, that the second rechargeable battery pack 330 is connected and transmits the identification signal to the tool control module 3131 so as to indicate that the second rechargeable battery pack 330 is attached to the first power tool 3101, and then the tool control module 3131 transmits a second control signal to the power limiting module so that the power limiting module increases impedance to limit the maximum output current of the rechargeable battery pack, that is, a second discharge current, where the second discharge current is less than or equal to the first discharge current so that the power tool is prevented from burning out or entering the over-current protection and failing to start. In some examples, when the tool identification module identifies, through the tool communication terminal, that the second rechargeable battery pack 330 is connected through the tool interface, the tool identification module transmits the second control signal to the control module so as to control the second rechargeable battery pack 330 to discharge at the second discharge current which is not greater than the first discharge current. When the second rechargeable battery pack 330 is used as the power supply of the power tool, if the power tool is the second power tool 3102, the tool identification module identifies, through the tool communication terminal, that the second rechargeable battery pack 330 is connected through the tool interface and transmits the identification signal to the control module so as to indicate that the second rechargeable battery pack 330 is attached to the second power tool 3102, and then the control module transmits a first control signal to the power limiting module so that the power limiting module maintains the maximum output current of the rechargeable battery pack, and thus the power tool operates at a larger current and power.

FIG. 23 is a circuit block diagram of a power tool system as another example. A difference from the power tool system shown in FIG. 20 is that a rechargeable battery pack 90 further includes a power supply control module 98 and a power limiting module 97. In this example, the power supply control module 98 and the power limiting module 97 are disposed in the rechargeable battery pack. A temperature sensor 96 is configured to detect a temperature of a cell assembly and communicatively connected to the power supply control module 98. Specifically, the temperature sensor 96 is configured to detect a temperature of a cell. When the temperature of the cell is greater than or equal to a threshold, the temperature sensor 96 outputs an over-temperature signal to the power supply control module 98 to cause the battery pack 90 to stop outputting electric power, thereby preventing the battery pack from explosion due to overheating. The temperature sensor may be a thermistor such as a thermistor of an NTC or a thermistor of a PTC. Since such a temperature sensor 96 is well-known in the art, the detailed description of functional operations is omitted for brevity.

A power supply identification module 95 is configured to identify a power tool connected through a power supply interface. Optionally, the power supply identification module 95 is configured to identify that the power tool connected through the battery pack interface is one of the first power tool 3101 or the second power tool 3102. The power supply identification module 95 is connected to a power supply communication terminal 94. The power supply identification module 95 communicates with the power tool attached to the battery pack and senses information of the power tool through the power supply communication terminal 94. The information of the power tool includes one or more of a power limit, a current limit, or a voltage limit of the power tool. Therefore, the power supply identification module 95 can determine, according to the information of the power tool, whether the first power tool 3101 or the second power tool 3102 is connected through the power supply interface and transmit an identification signal to the power supply control module 98. Specifically, if the rechargeable battery pack in operation is connected to the first power tool 3101, the power supply identification module 95 receives a signal including information of the first power tool 3101 via the power supply communication terminal 94. If the rechargeable battery pack in operation is connected to the second power tool 3102, the power supply identification module 95 receives a signal including information of the second power tool 3102 via the power supply communication terminal 94.

The power supply control module 98 controls a maximum power and a maximum current outputted by the rechargeable battery pack. The power supply control module 98 is communicatively connected to the power limiting module 97. The power supply control module 98 is configured to receive the identification signal from the power supply identification module 95 and according to the identification signal from the identification module, adjust impedance of the power limiting module 97 so as to limit the maximum power and the maximum current of the rechargeable battery pack or maintain a relatively low internal resistance of the power limiting module 97 to maintain the maximum power and the maximum current of the rechargeable battery pack. The power supply control module 98 may be a digital controller, a microprocessor, an analog circuit, a digital signal processor, or one or more digital integrated circuit (IC) smart devices of an application-specific integrated circuit (ASIC).

In some examples, when the second rechargeable battery pack 330 is connected to the first power tool 3101, the power supply identification module receives the signal including the information of the first power tool 3101 and transmits the signal to a discharge control module, and the discharge control module adjusts the impedance of the power limiting module so as to control the second rechargeable battery pack 330 to discharge at the second discharge current which is not greater than the first discharge current. When the second rechargeable battery pack 330 is connected to the second power tool 3102, the power supply identification module receives the signal including the information of the second power tool 3102 and transmits the signal to a second discharge control module, and the second discharge control module adjusts the impedance of the power limiting module to a minimum value so that the second rechargeable battery pack 330 is discharged at a third discharge current greater than the first discharge current.

Moreover, when the second rechargeable battery pack 330 is connected to the second power tool 3102, the discharge control module controls the second rechargeable battery pack 330 to supply electric power to the second power tool at a second voltage, where the second voltage is greater than a first voltage. Specifically, when the second rechargeable battery pack 330 is connected through the tool interface of the second power tool 3102, the power supply identification module receives the signal including the information of the second power tool 3102 and transmits the signal to the second discharge control module, and the second discharge control module adjusts the impedance of the power limiting module to the minimum value so that the second rechargeable battery pack 330 outputs electric power at the second voltage.

Referring to FIG. 24 which is a circuit block diagram of a power tool system as another example, a power tool 40 further includes a connection unit 47, a first discharge module 48, and a second discharge module 49.

The first discharge module 48 and the second discharge module 49 include other electronic elements in the power tool, and the first discharge module 48 and the second discharge module 49 have at least one or more of different power limits, current limits, or voltage limits. In some examples, the first discharge module 48 is adaptable to the first rechargeable battery pack 320. When the first battery pack is used as a power source of the power tool, the first discharge module operates so that the first power tool has first output performance. The second discharge module 49 is adaptable to the second rechargeable battery pack 330. When the second battery pack is used as the power source of the power tool, the second discharge module operates so that the power tool has second output performance different from the first output performance.

The connection unit 47 is selectively connected to the first discharge module 48 and the second discharge module 49. The connection unit 47 has an input terminal, an output terminal, and a control terminal. The input terminal of the connection unit 47 is connected to a tool positive terminal 421, the output terminal of the connection unit 47 is selectively connected to the first discharge module 48 or the second discharge module 49, and the control terminal of the connection unit 47 is connected to a control module 45. In some examples, when the first rechargeable battery pack 320 is connected through the tool interface, the connection unit 47 is connected to the first discharge module 48; and when the second rechargeable battery pack 330 is connected through the tool interface, the connection unit 47 is connected to the second discharge module 49. It is to be understood that the connection unit 47, the first discharge module 48, and the second discharge module 49 may also be connected in series between a tool negative terminal 422 and the motor.

A tool identification module 46 may sense the type of the rechargeable battery pack (the first rechargeable battery pack 320 or the second rechargeable battery pack 330) attached to the power tool and directly transmit the sensed signal to the control module 45 so as to indicate whether the first rechargeable battery pack 320 or the second rechargeable battery pack 330 is attached. Therefore, the control module 45 is configured to control, according to the identification signal, the connection unit 47 to be selectively connected to the first discharge module 48 and the second discharge module 49. Specifically, the control module 45 is configured to: when the first rechargeable battery pack 320 is connected through the tool interface, control the connection unit 47 to connect the tool positive terminal to the first discharge module 48, and when the second rechargeable battery pack 330 is connected through the tool interface, control the connection unit 47 to connect the tool positive terminal to the second discharge module 49.

The battery packs for supplying power to the power tools mostly use cylindrical lithium cells. Multiple cylindrical lithium cells connected in series and in parallel ensure sufficient electric power output so that the endurance of the power tools is improved. For example, an output voltage of a cylindrical lithium cell is about 3.6 V, and then the maximum number of lithium cells connected in series in a battery pack with an output voltage of 18 V is 5.

With the development of battery technology, a battery pack with a higher output voltage and a relatively low impedance in a chemical composition and configuration form and various other different battery packs bring inconvenience to the user since a specific charger needs to be specially designed for each battery pack to charge the battery pack. To solve the defects in the related art, an object of the present application is to provide a charging system and a battery pack which can improve the charging compatibility of the charging system and the battery pack. A detailed description is given below.

FIGS. 25 and 26 show a charging system 400, where the charging system includes a first rechargeable battery pack 320, a second rechargeable battery pack 330, and a charger 340 that is adaptable to the first rechargeable battery pack 320 and the second rechargeable battery pack 330 to charge the battery pack.

FIG. 26 shows a circuit block diagram of a charging system 400 according to an example. The charging system 400 includes a rechargeable battery pack (the first rechargeable battery pack 320 or the second rechargeable battery pack 330) and a charger (a first charger 3401 or a second charger). Since the first rechargeable battery pack 320 and the second rechargeable battery pack 330 have the same circuit block diagram and the first charger 3401 and the second charger have the same circuit block diagram, the circuit block diagrams of the first rechargeable battery pack 320 and the first charger are used as an example.

The first rechargeable battery pack 320 includes at least multiple cells connected in series. FIG. 26 shows four cells connected in series. The rechargeable battery pack may have more than four cells, and the number of cells is not limited herein. The rechargeable battery pack further includes a power supply positive terminal 3201, a power supply negative terminal 3202, a power supply communication terminal 3203, a power supply identification module 3205, and a temperature sensor 3204.

The power supply positive terminal 3201 and the power supply negative terminal 3202 are configured for output of a discharge current or input of a charge current. The power supply communication terminal 3203 is configured for communication with the charger. The power supply positive terminal 3201 is disposed in a power supply positive interface, the power supply negative terminal 3202 is disposed in a power supply negative interface, and the power supply communication terminal 3203 is disposed in a power supply communication interface.

The temperature sensor 3204 is configured to detect a temperature of a cell group. In some examples, the temperature sensor 3204 is connected to the power supply communication terminal 3203. Specifically, the temperature sensor 3204 is disposed on a surface of a cell and configured to detect a temperature of the surface of the cell. The temperature sensor 3204 may be a thermistor such as a thermistor of an NTC or a thermistor of a PTC.

The power supply identification module 3205 stores an ID of the rechargeable battery pack and is configured to identify the first rechargeable battery pack 320 or the second rechargeable battery pack 330 when inserted into the charger. The ID of the rechargeable battery pack includes, for example, a model, a version, a cell configuration, and a battery type such as a battery with cylindrical cells or a battery with flat cells. The ID of the rechargeable battery pack may be one or more communication codes and may also be an ID resistor, an LED display configured to display identification data of the rechargeable battery pack, serial data sent when the rechargeable battery pack is connected to or sensed by a power tool or the charger, fields in a frame of data sent to the charger through the power supply communication interface, or the like.

The first charger 3401 includes a current detection module 3402, a power detection module 3403, a temperature detection module 3404, a charging identification module 3405, a charging control module 3406, and a current control module 3407. Moreover, the charger 3401 further includes a switch module 3408 configured to allow and prevent a charge current and a power supply module 3409 configured to adjust an external power supply to electric power that may be used by other electronic components or circuits in the battery pack and the charger. Of course, the power detection module 3403 and the temperature detection module 3404 may also be disposed in the battery pack, which is not limited herein.

The current detection module 3402 is configured to detect the charge current of the charger 3401. In some examples, the current detection module 3402 is a resistor and detects a voltage applied to the resistor so as to obtain the charge current flowing into the battery pack.

The power supply module 3409 includes a rectifier circuit and a filter circuit and is configured to rectify and filter an alternating current from an alternating current power supply to output a direct current.

The charger 3401 further includes an output positive terminal 3411, an output negative terminal 3421, and a charging communication terminal 3431. The output positive terminal 3411 and the output negative terminal 3421 are configured for output of the charge current. The charging communication terminal 3431 is configured for communication with the first rechargeable battery pack 320.

When the first rechargeable battery pack 320 is inserted into the charger 3401, the temperature sensor 3204 is coupled to the temperature detection module 3404 of the charger, and the power detection module 3403 is electrically connected to the power supply positive terminal 3201 and the power supply negative terminal 3202 at two ends of the battery pack and configured to detect the power of the battery pack 320.

The charging identification module 3405 is configured to identify one of the first rechargeable battery pack 320 or the second rechargeable battery pack 330 connected to the charger. The charging identification module 3405 is connected to the charging communication terminal 3431. The charging identification module 3405 can communicate with the battery pack attached to the charger and sense information of the battery pack through the charging communication terminal 3431 to identify one of the first rechargeable battery pack 320 or the second rechargeable battery pack 330 connected to the charger and then transmit an identification signal to the charging control module 3406. The information of the battery pack includes the model, the version, the cell configuration, and the battery type such as the battery with cylindrical cells or the battery with flat cells. In some examples, the charging identification module 3405 is a determination resistor that divides a reference voltage together with the power supply identification module. A voltage component is outputted as the information of the battery pack.

The charging control module 3406 can determine, according to the information of the battery pack, whether the first rechargeable battery pack 320 or the second rechargeable battery pack 330 is connected through a charging interface so as to control the charge current of the charger. The charging control module 3406 transmits a current control signal to the current control module 3407 according to the identification signal. In this example, in the case where the charger is connected to the first rechargeable battery pack 320, the charging control module 3406 controls the charger to charge the first rechargeable battery pack 320 at a first charge current; and in the case where the charger is connected to the second rechargeable battery pack 330, the charging control module 3406 controls the charger to perform charging at a second charge current.

The current control module 3407 is configured to adjust the charge current flowing into the battery pack and communicatively connected to the charging control module 3406. Therefore, the current control module 3407 is configured to receive the current control signal from the charging control module 3406 to limit a maximum output current from the power supply module or maintain the maximum output current of the power supply module. Specifically, the current control module 3407 includes a power limiting device, where the power limiting device may be a passive resistor and may also be an active resistor whose resistance changes with the current control signal, for example, a semiconductor device or circuit with a current limiting function, such as the FET.

The switch module 3408 is connected on a charging loop and coupled to the charging control module 3406. The switch module 3408 receives a control signal from the charging control module 3406 and switches a state of a switch to control the charging loop to be on or off.

The specific operation process is described below. The charging identification module 3405 communicates with the battery pack attached to the charger and senses the information of the battery pack through the charging communication terminal 3431 to identify one of the first rechargeable battery pack 320 or the second rechargeable battery pack 330 connected to the charger and transmits the identification signal to the charging control module 3406. At the same time, the power detection module 3403 and the temperature detection module 3404 also transmit the received power information and temperature information of the temperature sensor 3204 to the charging control module 3406. After internally processing the information of the battery pack, the power information, and the temperature information, the charging control module 3406 transmits the current control signal to the current control module 3407 to adjust the charge current or the charging control module 3406 transmits the current control signal to the switch module 3408 to control the charging loop to be on or off so as to allow the charge current to flow into the battery pack or prevent the charge current from flowing into the battery pack. In this example, a resistance of the current control module 3407 is changed so as to change a charge current mode. If the resistance of the current control module 3407 changes, at least two optional charge current modes are provided: a first charge current mode adaptable to the first rechargeable battery pack 320 and providing a relatively low current and a second charge current mode providing a charge current greater than the current in the first charge current mode, where the charge current in the first charge current mode is the first charge current; and the charge current in the second charge current mode is the second charge current.

FIG. 27 is a circuit block diagram of a charging system 500 as another example. A difference from the charging system 400 shown in FIG. 26 is that the current control module is disposed in the rechargeable battery pack, that is, the first rechargeable battery pack 320 further includes a current control module 3206, where the current control module 3206 is connected to the power supply communication terminal 3203.

The charging identification module 3405 is configured to identify one of the first rechargeable battery pack 320 or the second rechargeable battery pack 330 connected to the charger. The charging identification module 3405 is connected to the charging communication terminal 3431. The charging identification module 3405 can communicate with the battery pack attached to the charger and sense the information of the battery pack through the charging communication terminal 3431 to identify one of the first rechargeable battery pack 320 or the second rechargeable battery pack 330 connected to the charger and then transmit the identification signal to the charging control module 3406. The information of the battery pack includes the model, the version, the cell configuration, and the battery type such as the battery with cylindrical cells or the battery with flat cells. In some examples, the charging identification module is the determination resistor that divides the reference voltage together with the power supply identification module. The voltage component is outputted as the information of the battery pack.

The charging control module 3406 can determine, according to the information of the battery pack, whether the first rechargeable battery pack 320 or the second rechargeable battery pack 330 is connected through a tool interface so as to control the charge current of the charger. The charging control module 3406 transmits the current control signal to the current control module 3206 according to the identification signal. In this example, in the case where the charger is connected to the first rechargeable battery pack 320, the charging control module 3406 controls the charger to charge the first rechargeable battery pack 320 at the first charge current; and in the case where the charger is connected to the second rechargeable battery pack 330, the charging control module controls the charger to charge the second rechargeable battery pack 330 at the second charge current or the first charge current.

The current control module 3206 is configured to adjust a charge current flowing into the cell group. The current control module 3206 receives the current control signal from the charging control module 3406 through the power supply communication terminal 3203 to adjust the charge current flowing into the cell group. Specifically, the current control module includes the power limiting device, where the power limiting device may be the passive resistor and may also be the active resistor whose resistance changes with the current control signal, for example, the semiconductor device or circuit with the current limiting function, such as the FET. In this example, in the case where the charger is connected to the first rechargeable battery pack 320, the current control module 3206 controls the cell group to be charged at the first charge current; and in the case where the charger is connected to the second rechargeable battery pack 330, the current control module 3206 controls the cell group to be charged at the second charge current. Therefore, the current control module is configured to receive the current control signal from the charging control module 3406 so as to limit the maximum charge current from the charger or maintain the maximum charge current from the charger.

The specific operation process is described below. The charging identification module 3405 communicates with the battery pack attached to the charger and senses the information of the battery pack through the charging communication terminal 3431 to identify one of the first rechargeable battery pack 320 or the second rechargeable battery pack 330 connected to the charger and transmits the identification signal to the charging control module. At the same time, the power detection module 3403 and the temperature detection module 3404 also transmit the received power information and the temperature information of the temperature sensor to the charging control module 3206. After internally processing the information of the battery pack, the power information, and the temperature information, the charging control module 3406 transmits the current control signal to the current control module 3206 to adjust the charge current or the charging control module 3406 transmits the current control signal to the switch module 3408 to control the charging loop to be on or off so as to allow the charge current to flow into the battery pack or prevent the charge current from flowing into the battery pack. In this example, the resistance of the current control module is changed so as to change the charge current mode. If the resistance of the current control module changes, at least two optional charge current modes are provided: the first charge current mode adaptable to the first rechargeable battery pack 320 and providing a relatively low current and the second charge current mode providing the charge current greater than the current in the first charge current mode, where the charge current in the first charge current mode is the first charge current; and the charge current in the second charge current mode is the second charge current.

FIG. 28 is a circuit block diagram of a charging system 600 as another example. A difference from the charging system 500 shown in FIG. 27 is that a charging control module 3207 is disposed in the rechargeable battery pack, that is, the rechargeable battery pack includes the charging control module 3207, where the charging control module 3207 can control the switch module 3408 to be on or off through the power supply communication terminal 3203.

The power supply identification module 3205 is configured to identify one of the first charger 3401 or the second charger connected to the rechargeable battery pack. The power supply identification module 3205 is connected to the power supply communication terminal 3203. The power supply identification module 3205 can communicate with the charger attached to the battery pack and sense information of the charger through the power supply communication terminal 3203 to identify one of the first charger 3401 or the second charger connected to the rechargeable battery pack and then transmit the identification signal to the charging control module 3207. The information of the charger includes a charge voltage and a charge current.

The charging control module 3207 can determine, according to the information of the charger, whether the first charger 3401 or the second charger is connected through a power supply interface so as to control the charge current of the cell group. The charging control module 3207 transmits the current control signal to the current control module according to the identification signal.

The current control module 3206 is configured to adjust the charge current flowing into the cell group. The current control module 3206 receives the current control signal from the charging control module 3207 through the power supply communication terminal 3203 to adjust the charge current flowing into the cell group. Specifically, the current control module 3206 includes the power limiting device, where the power limiting device may be the passive resistor and may also be the active resistor whose resistance changes with the current control signal, for example, the semiconductor device or circuit with the current limiting function, such as the FET.

In this manner, when the first rechargeable battery pack 320 is connected to the first charger 3401, the first charger 3401 performs charging at the first charge current. Specifically, when the first rechargeable battery pack 320 is powered by the first charger 3401, the power supply identification module 3205 of the first rechargeable battery pack 320 transmits the identification signal to the charging control module 3207 to indicate that the first charger 3401 is attached to the first rechargeable battery pack 320, and the charging control module 3207 transmits a first current control signal to the current control module 3206 so that the current outputted from the current control module 3206 to the cell group remains the first charge current from the first charger 4301. When the first rechargeable battery pack 320 is connected to the second charger, the power supply identification module 3205 identifies that the second charger is connected and transmits the identification signal to the charging control module 3207 to indicate that the second charger is attached to the first rechargeable battery pack 320, and the charging control module 3207 transmits a second current control signal to the current control module 3206 so that the current control module 3206 limits the charge current from the second charger, and thus the current outputted from the current control module 3206 to the cell group is not greater than the first charge current, thereby preventing the first rechargeable battery pack 320 from being overcharged and damaged.

Moreover, when the second rechargeable battery pack 330 is connected to the first charger 3401, the power supply identification module 3205 of the second rechargeable battery pack 330 transmits the identification signal to the charging control module 3207 to indicate that the first charger 3401 is attached to the second rechargeable battery pack 330, and then the charging control module 3207 transmits the first current control signal to the current control module 3206 so that the current outputted from the current control module 3206 to the cell group remains the first charge current from the first charger 3401, and thus the first charger 3401 is prevented from supplying power to the second rechargeable battery pack 330 at a current exceeding a rated current, thereby preventing the first charger 3401 from being damaged due to heating. When the second rechargeable battery pack 330 is connected to the second charger, the power supply identification module 3205 of the second rechargeable battery pack 330 transmits the identification signal to the charging control module 3207 to indicate that the second charger is attached to the second rechargeable battery pack 330, and the charging control module 3207 transmits a third control signal to the current control module 3206 so that the current control module 3206 controls the current outputted to the cell group to remain the second charge current from the second charger.

What is claimed is:

1. A battery pack for a power tool, comprising:
a housing comprising a first material;
a cell assembly disposed in the housing and comprising a plurality of cell units, wherein each of the plurality of cell units comprises a positive electrode and a negative electrode;
a cell support comprising a second material, which is configured to support at least the cell assembly; and
a buffer layer disposed between adjacent cell units and made of the second material;
wherein the cell support is at least disposed at two ends of the cell assembly, at least part of the cell support encapsulates the positive electrode of each of the plurality of cell units and the negative electrode of each of the plurality of the cell units, and the first material is different from the second material.

2. The battery pack of claim 1, wherein the cell support comprises a first support and a second support, the first support is disposed on a front end surface of the cell assembly, the second support is disposed on a rear end surface opposite to the front end surface, and the front end surface and the rear end surface are opposite to each other.

3. The battery pack of claim 1, wherein the cell support is disposed around a front end surface, a rear end surface, a left side surface, a right side surface, and a lower bottom surface of the cell assembly, and the cell support forms an accommodation space with an upper opening and for accommodating the cell assembly.

4. The battery pack of claim 1, wherein a positive lead-out piece connects a positive terminal of the cell assembly to the positive electrodes of the plurality of cell units, a negative lead-out piece connects a negative terminal of the cell assembly to the negative electrodes of the plurality of cell units, and the cell support encapsulates the positive electrodes of the plurality of cell units, the negative electrodes of the plurality of cell units, the positive lead-out piece, and the negative lead-out piece.

5. The battery pack of claim 1, wherein the first material is a thermoplastic material; and the second material is a thermosetting material.

6. The battery pack of claim 1, wherein the cell support is formed at the two ends of the cell assembly in a glue injection manner.

7. The battery pack of claim 1, wherein the battery pack has a discharge current of greater than or equal to 80 A.

8. The battery pack of claim 1, wherein an energy density of the cell assembly is in a value range of greater than or equal to 200 Wh/kg.

9. The battery pack of claim 1, wherein the plurality of cell units are a plurality of sheet-shaped cells arranged in a stack.

10. The battery pack of claim 1, wherein the battery pack has a discharge current of greater than or equal to 100 A.

11. The battery pack of claim 1, wherein in a case where the battery pack is discharged at a rate of 10 C, a temperature rise is less than 45° C.

12. A battery pack, comprising:

a housing comprising a first material;

a cell assembly disposed in the housing and comprising a plurality of cell units, wherein each of the plurality of cell units comprises a positive electrode and a negative electrode;

a cell support comprising a second material, which is configured to support at least the cell assembly;

a buffer layer disposed between adjacent cell units;

wherein the cell support is at least disposed at two ends of the cell assembly, at least part of the cell support encapsulates the positive electrode of each of the plurality of cell units and the negative electrode of each of the plurality of the cell units, and a hardness of the first material is different from a hardness of the second material.

13. The battery pack of claim 12, wherein the cell support comprises a first support and a second support, the first support is disposed on a front end surface of the cell assembly, the second support is disposed on a rear end surface of the cell assembly, and the front end surface and the rear end surface are opposite to each other.

14. The battery pack of claim 12, wherein the cell support is disposed around a front end surface, a rear end surface, a left side surface, a right side surface, and a lower bottom surface of the cell assembly, and the cell support forms an accommodation space with an upper opening and for accommodating the cell assembly.

15. The battery pack of claim 12, wherein a positive lead-out piece connects a positive terminal of the cell assembly to the positive electrodes of the plurality of cell units, a negative lead-out piece connects a negative terminal of the cell assembly to the negative electrodes of the plurality of cell units, and the cell support encapsulates the positive electrodes of the plurality of cell units, the negative electrodes of the plurality of cell units, the positive lead-out piece, and the negative lead-out piece.

16. The battery pack of claim 12, wherein the plurality of cell units are a plurality of sheet-shaped cells arranged in a stack.

17. The battery pack of claim 12, wherein the battery pack has a discharge current of greater than or equal to 100 A.

18. The battery pack of claim 12, wherein in a case where the battery pack is discharged at a rate of 10 C, a temperature rise is less than 45° C.

* * * * *